(12) United States Patent
Van Boeyen et al.

(10) Patent No.: US 11,749,814 B2
(45) Date of Patent: Sep. 5, 2023

(54) SEAL CONFIGURATION FOR ELECTROCHEMICAL CELL

(71) Applicant: NUVERA FUEL CELLS, INC., Billerica, MA (US)

(72) Inventors: Roger Van Boeyen, Westford, MA (US); Edward Domit, Westford, MA (US); Kevin Beverage, Leominster, MA (US); Scott Blanchet, Chelmsford, MA (US); John Stang, Columbus, IN (US)

(73) Assignee: Nuvera Fuel Cells, LLC, Billerica, MA (US)

( * ) Notice: Subject to any disclaimer, the term of this patent is extended or adjusted under 35 U.S.C. 154(b) by 308 days.

(21) Appl. No.: 17/087,239

(22) Filed: Nov. 2, 2020

(65) Prior Publication Data

US 2021/0057764 A1    Feb. 25, 2021

Related U.S. Application Data

(62) Division of application No. 14/445,357, filed on Jul. 29, 2014, now Pat. No. 10,847,815.

(Continued)

(51) Int. Cl.
  *H01M 8/0273* (2016.01)
  *H01M 8/0247* (2016.01)
  (Continued)

(52) U.S. Cl.
  CPC ............ *H01M 8/0273* (2013.01); *C25B 9/00* (2013.01); *C25B 9/19* (2021.01); *C25B 9/73* (2021.01);
  (Continued)

(58) Field of Classification Search
  None
  See application file for complete search history.

(56) References Cited

U.S. PATENT DOCUMENTS 3,326,722 A * 6/1967 Hasbrouck .......... H01M 8/0271
                                                   429/513
3,379,460 A    4/1968 Allyn
         (Continued)

FOREIGN PATENT DOCUMENTS

DE    10 2004 028857 A1    1/2006
JP       2004-115860 A     4/2004
         (Continued)

OTHER PUBLICATIONS

European Patent Application No. 15 757 628.1, Examination Report dated Sep. 28, 2018 (6 pages).

(Continued)

*Primary Examiner* — Zhongqing Wei
(74) *Attorney, Agent, or Firm* — Finnegan, Henderson, Farabow, Garrett & Dunner, LLP

(57) ABSTRACT

An electrochemical cell includes a pair of bipolar plates and a membrane electrode assembly between the bipolar plates. The membrane electrode assembly comprises an anode compartment, a cathode compartment, and a proton exchange membrane disposed therebetween. The cell further includes a sealing surface formed in one of the pair of bipolar plates and a gasket located between the sealing surface and the proton exchange membrane. The gasket is configured to plastically deform to create a seal about one of the cathode compartment or the anode compartment. The sealing surface can include one or more protrusions.

10 Claims, 18 Drawing Sheets

Related U.S. Application Data

(60) Provisional application No. 61/859,457, filed on Jul. 29, 2013.

(51) Int. Cl.
| | |
|---|---|
| *H01M 8/1004* | (2016.01) |
| *C25B 9/00* | (2021.01) |
| *C25B 9/20* | (2006.01) |
| *C25B 9/06* | (2006.01) |
| *H01M 8/241* | (2016.01) |
| *C25B 9/19* | (2021.01) |
| *C25B 9/73* | (2021.01) |
| *H01M 8/10* | (2016.01) |
| *H01M 4/86* | (2006.01) |

(52) U.S. Cl.
CPC ....... *H01M 8/0247* (2013.01); *H01M 8/1004* (2013.01); *H01M 8/241* (2013.01); *H01M 2004/8694* (2013.01); *H01M 2008/1095* (2013.01)

(56) References Cited

U.S. PATENT DOCUMENTS

| | | | |
|---|---|---|---|
| 5,523,181 | A | 6/1996 | Stonehart et al. |
| 5,653,857 | A | 8/1997 | Getsy et al. |
| 6,036,194 | A | 3/2000 | Stamper |
| 6,309,521 | B1 | 10/2001 | Andrews et al. |
| 6,355,371 | B1 | 3/2002 | Farkash et al. |
| 7,014,939 | B2 | 3/2006 | Suenaga et al. |
| 7,670,719 | B2 | 3/2010 | Nakaishi et al. |
| 8,153,288 | B2 | 4/2012 | Sugita et al. |
| 8,877,406 | B2 | 11/2014 | Yoshikawa et al. |
| 8,999,597 | B2 | 4/2015 | Ikezoe et al. |
| 9,005,840 | B2 | 4/2015 | Morimoto et al. |
| 9,567,679 | B2 | 2/2017 | Domit et al. |
| 2002/0122970 | A1 | 9/2002 | Inoue et al. |
| 2003/0022045 | A1 | 1/2003 | Wells et al. |
| 2003/0062268 | A1 | 4/2003 | Kosek et al. |
| 2003/0072988 | A1 | 4/2003 | Frisch et al. |
| 2004/0038102 | A1 | 2/2004 | Beckmann et al. |
| 2004/0040862 | A1 | 3/2004 | Kosek et al. |
| 2004/0146772 | A1 | 7/2004 | Miyao |
| 2005/0136312 | A1 | 6/2005 | Bourgeois et al. |
| 2007/0231619 | A1 | 10/2007 | Strobel et al. |
| 2007/0298310 | A1* | 12/2007 | Kato .............. H01M 8/0247 429/514 |
| 2009/0004539 | A1 | 1/2009 | Ishikawa et al. |
| 2009/0075134 | A1 | 3/2009 | Tanaka et al. |
| 2009/0087713 | A1* | 4/2009 | Yoshida .............. H01M 4/8814 429/483 |
| 2009/0280391 | A1 | 11/2009 | Chang et al. |
| 2010/0096392 | A1 | 4/2010 | Kamiya et al. |
| 2010/0167140 | A1 | 7/2010 | Balliet |
| 2014/0051007 | A1 | 2/2014 | Blanchet et al. |
| 2015/0263360 | A1 | 9/2015 | Cerceau et al. |
| 2016/0060775 | A1 | 3/2016 | Domit et al. |
| 2017/0107633 | A1 | 4/2017 | Domit et al. |

FOREIGN PATENT DOCUMENTS

| | | |
|---|---|---|
| JP | 2007-324114 A | 12/2007 |
| JP | 2008-004478 A | 1/2008 |
| JP | 2009/037980 A | 2/2009 |
| JP | 2010/165625 A | 7/2010 |
| JP | 2010-165625 A | 7/2010 |
| JP | H10-286572 A | 10/2010 |
| WO | WO 2014/053770 A1 | 4/2014 |
| WO | WO 2014/134295 A1 | 9/2014 |
| WO | WO 2015/017429 A2 | 2/2015 |
| WO | WO 2016/033147 A1 | 3/2016 |

OTHER PUBLICATIONS

Chinese Patent Application No. 2014800536002, Office Action dated May 23, 2018 (10 pages).
European Patent Application No. 14 750 912.9-1108, Examination Report dated Apr. 18, 2018 (5 pages).
U.S. Appl. No. 14/835,969, Non-Final Office Action, dated Jun. 12, 2018.
Japanese Patent Application No. 2015-560305, by Nuvera Fuel Cells, Inc.: Notice of Reasons For Rejection, dated Jan. 25, 2018, with English Translation (11 pages).
U.S. Appl. No. 14/835,969: Final Office Action, dated Mar. 19, 2018 (11 pages).
Australian Patent Application No. 2014223472, by Nuvera Fuel Cells, Inc.: Examination Report No. 1, dated Apr. 24, 2017 (3 pages).
Australian Patent Application No. 2014296367 by Nuvera Fuel Cells, Inc.: Examination Report No. 1, dated May 31, 2017 (4 pages).
Chinese Patent Application No. 201480010976.5 by Nuvera Fuel Cells, Inc.: Office Action, dated Mar. 14, 2017, with English Translation (10 pages).
Chinese Patent Application No. 201480010976.5 by Nuvera Fuel Cells, Inc.: Office Action, dated Oct. 18, 2017, with English Translation (5 pages).
Chinese Patent Application No. 201480053600.2 by Nuvera Fuel Cells, Inc.: Office Action, dated Sep. 20, 2017, with English Translation (11 pages).
International Search Report and Written Opinion issued in PCT Application No. PCT/US2014/018996, dated Jun. 2, 2014 (11 pages).
U.S. Appl. No. 14/192,006, filed Feb. 27, 2014, by Domit et al.: Non-Final Office Action, dated Nov. 13, 2015 (11 pages).
U.S. Appl. No. 14/192,006, filed Feb. 27, 2014, by Domit et al.: Final Office Action, dated Apr. 19, 2016 (19 pages).
U.S. Appl. No. 14/192,006, filed Feb. 27, 2014, by Domit et al.: Advisory Action, dated Jul. 1, 2016 (3 pages).
U.S. Appl. No. 14/192,006, filed Feb. 27, 2014, by Domit et al.: Notice of Allowance, dated Sep. 28, 2016 (7 pages).
U.S. Appl. No. 14/835,969: Restriction Requirement, dated Dec. 6, 2016 (7 pages).
U.S. Appl. No. 14/835,969: Non-Final Office Action, dated Aug. 21, 2017 (11 pages).
U.S. Appl. No. 15/392,445, filed Dec. 28, 2016, by Domit et al.: Non-Final Office Action, dated Nov. 2, 2017 (6 pages).
International Search Report and Written Opinion, issued in PCT Application No. PCT/US2014/048656, dated Feb. 2, 2015 (17 pages).
International Search Report and Written Opinion, issued in PCT Application No. PCT/US2015/046871 dated Oct. 16, 2015 (9 pages).
Non-Final Office Action dated Feb. 10, 2017, issued in U.S. Appl. No. 14/835,969 (10 pages).
Applicant-Initiated Interview Summary dated May 4, 2017, issued in U.S. Appl. No. 14/835,969 (2 pages).
Invitation to Pay Additional Fees and Communication Relating to the Results of the Partial International Search, issued in corresponding PCT Application No. PCT/US2014/048656, dated Dec. 1, 2014, 7 pages.

* cited by examiner

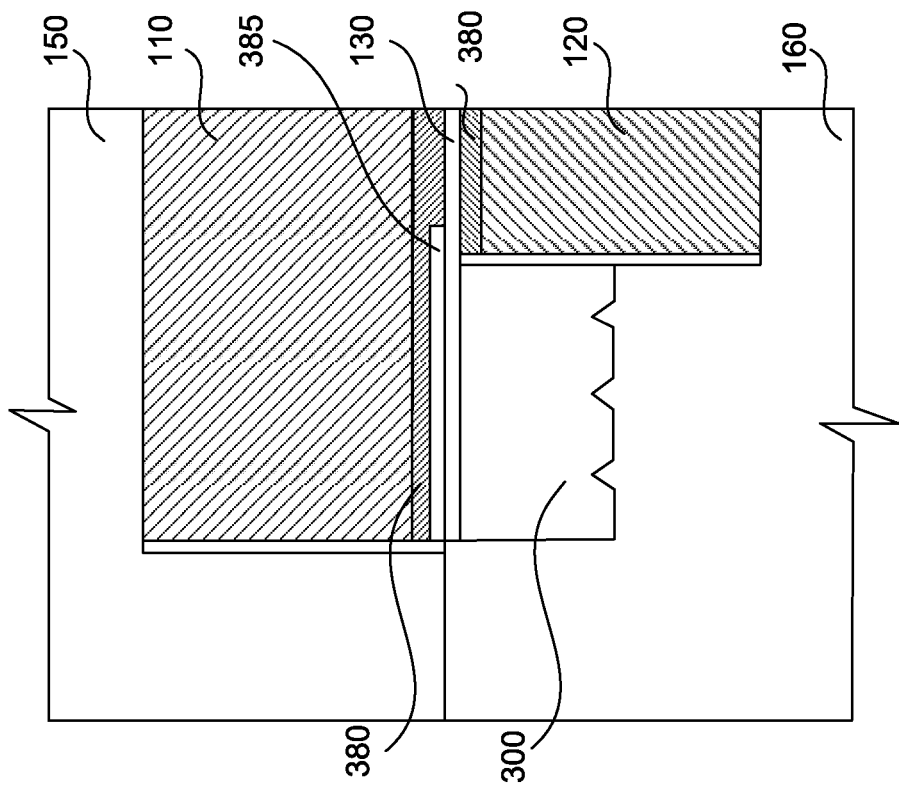
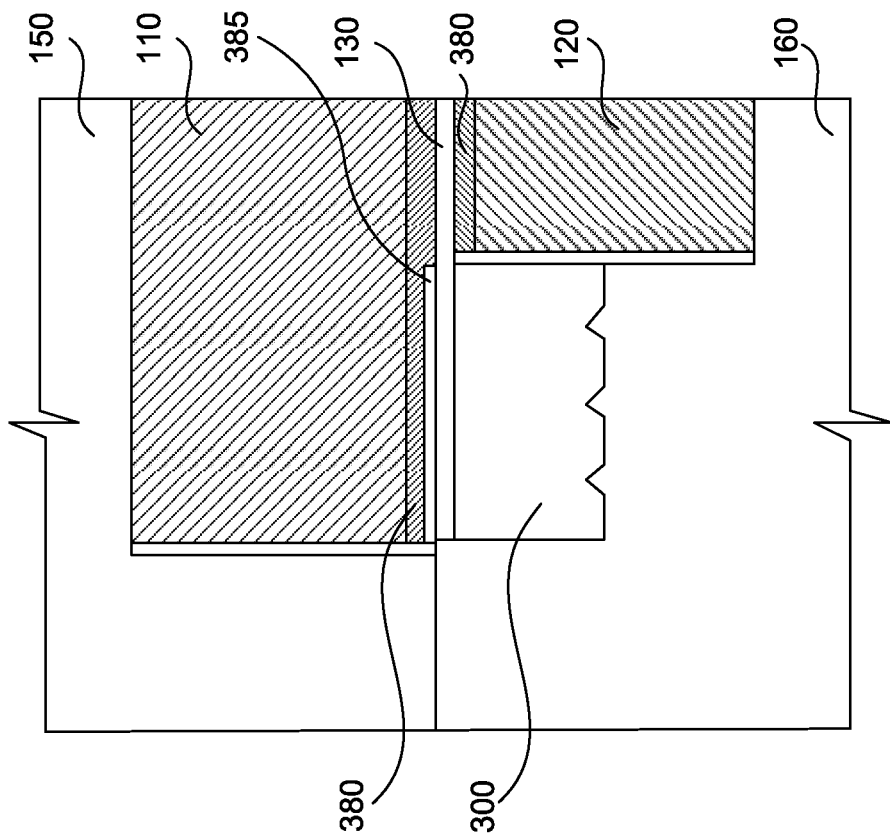
FIG. 12B
FIG. 12A

SEAL CONFIGURATION FOR ELECTROCHEMICAL CELL

This application is a divisional of U.S. Patent Application No. 14/445,357, filed Jul. 29, 2014, which claims the benefit of U.S. Provisional Application No. 61/859,457, filed Jul. 29, 2013, the entirety of which are incorporated herein by reference.

The present disclosure is directed towards an electrochemical cell, and more specifically, to an electrochemical cell having a cascade sealing configuration and configured for hydrogen reclamation.

Electrochemical cells, usually classified as fuel cells or electrolysis cells, are devices used for generating current from chemical reactions, or inducing a chemical reaction using a flow of current. A fuel cell converts the chemical energy of a fuel (e.g., hydrogen, natural gas, methanol, gasoline, etc.) and an oxidant (air or oxygen) into electricity and waste products of heat and water. A basic fuel cell comprises a negatively charged anode, a positively charged cathode, and an ion-conducting material called an electrolyte.

Different fuel cell technologies utilize different electrolyte materials. A Proton Exchange Membrane (PEM) fuel cell, for example, utilizes a polymeric ion-conducting membrane as the electrolyte. In a hydrogen PEM fuel cell, hydrogen atoms can electrochemically split into electrons and protons (hydrogen ions) at the anode. The electrons flow through the circuit to the cathode and generate electricity, while the protons diffuse through the electrolyte membrane to the cathode. At the cathode, hydrogen protons can react with electrons and oxygen (supplied to the cathode) to produce water and heat.

An electrolysis cell represents a fuel cell operated in reverse. A basic electrolysis cell can function as a hydrogen generator by decomposing water into hydrogen and oxygen gases when an external electric potential is applied. The basic technology of a hydrogen fuel cell or an electrolysis cell can be applied to electrochemical hydrogen manipulation, such as, electrochemical hydrogen compression, purification, or expansion.

An electrochemical hydrogen compressor (EHC), for example, can be used to selectively transfer hydrogen from one side of a cell to another. An EHC can comprise a proton exchange membrane sandwiched between a first electrode (i.e., an anode) and a second electrode (i.e., a cathode). A gas containing hydrogen can contact the first electrode and an electric potential difference can be applied between the first and second electrodes. At the first electrode, the hydrogen molecules can be oxidized and the reaction can produce two electrons and two protons. The two protons are electrochemically driven through the membrane to the second electrode of the cell, where they are rejoined by two rerouted electrons and reduced to form a hydrogen molecule. The reactions taking place at the first electrode and second electrode can be expressed as chemical equations, as shown below.

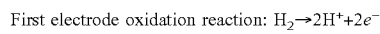

First electrode oxidation reaction: $H_2 \rightarrow 2H^+ + 2e^-$

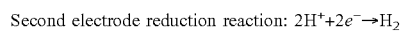

Second electrode reduction reaction: $2H^+ + 2e^- \rightarrow H_2$

Overall electrochemical reaction: $H_2 \rightarrow H_2$

EHCs operating in this manner are sometimes referred to as a hydrogen pumps. When the hydrogen accumulated at the second electrode is restricted to a confined space, the electrochemical cell compresses the hydrogen or raises the pressure. The maximum pressure or flow rate an individual cell is capable of producing can be limited based on the cell design.

To achieve greater compression or higher pressure, multiple cells can be linked in series to form a multi-stage EHC. In a multi-stage EHC the gas flow path, for example, can be configured so the compressed output gas of the first cell can be the input gas of the second cell. Alternatively, single-stage cells can be linked in parallel to increase the throughput capacity (i.e., total gas flow rate) of an EHC. In both a single-stage and multi-stage EHC, the cells can be stacked and each cell can include a cathode, an electrolyte membrane, and an anode. Each cathode/membrane/anode assembly constitutes a "membrane electrode assembly", or "MEA", which is typically supported on both sides by bipolar plates. In addition to providing mechanical support, the bipolar plates physically separate individual cells in a stack while electrically connecting them. The bipolar plates also act as current collectors/conductors, and provide passages for the fuel. Typically, bipolar plates are made from metals, for example, stainless steel, titanium, etc., and from non-metallic electrical conductors, for example, graphite.

Electrochemical hydrogen manipulation has emerged as a viable alternative to the mechanical systems traditionally used for hydrogen management. Successful commercialization of hydrogen as an energy carrier and the long-term sustainability of a "hydrogen economy" depends largely on the efficiency and cost-effectiveness of fuel cells, electrolysis cells, and other hydrogen manipulation/management systems (i.e., EHCs). Gaseous hydrogen is a convenient and common form for energy storage, usually by pressurized containment. Advantageously, storing hydrogen at high pressure yields high energy density.

Mechanical compression is a traditional means to achieve compression. However, there are disadvantages to mechanical compression. For example, substantial energy usage, wear and tear on moving parts, excessive noise, bulky equipment, and hydrogen embrittlement. Pressurization by thermal cycling is an alternative to mechanical compression, but like mechanical compression the energy usage is substantial. In contrast, electrochemical compression is quiet, scalable, modular, and can achieve high energy efficiency.

One challenge for electrochemical hydrogen compression is the safety concern regarding pressurized hydrogen gas. Hydrogen gas is extremely flammable and high pressure hydrogen gas raises safety issues. A major concern can include the leaking or unintended release of the high pressure gas from the electrochemical compressor. A catastrophic release could pose a safety hazard.

Moreover, even a small leak that may not rise to the level of a significant safety concern, nonetheless reduces the efficiency of the electrochemical compressor. Therefore, there is a need to prevent or reduce hydrogen leakage.

In consideration of the aforementioned circumstances, the present disclosure is directed toward an electrochemical cell having a seal configuration constructed to limit the unintended release of hydrogen from the cell. In addition, the seal configuration can enable the collection and recycling of hydrogen leaked from the cell. In certain embodiments disclosed herein, a cascade seal configuration is contemplated.

One aspect of the present disclosure is directed to an electrochemical cell comprising: a pair of bipolar plates, wherein a sealing surface is formed in one of the pair of bipolar plates, a membrane electrode assembly located between the pair of bipolar plates, wherein the membrane electrode assembly comprises an anode, a cathode, and a proton exchange membrane disposed therebetween; a first seal defining a high pressure zone, wherein the first seal is located between the bipolar plates and configured to contain a first fluid within the high pressure zone; a second seal defining an intermediate pressure zone, wherein the second seal is located between the bipolar plates and configured to contain a second fluid within the intermediate pressure zone; wherein the first seal is formed by a gasket that is configured to plastically deform to create a seal about one of the cathode compartment or the anode compartment. In certain embodiments, the sealing surface comprises one or more protrusions.

Yet another aspect of the present disclosure is directed to a method of sealing a compartment of an electrochemical cell. The method comprises assembling an electrochemical cell having a pair of bipolar plates and an anode compartment, a cathode compartment, and a proton exchange membrane disposed between the pair of bipolar plates. The method further includes sealing a gasket against the one of the bipolar plates by compressing the gasket with sufficient force to plastically deform the gasket, and sealing the proton exchange membrane against the gasket.

A further aspect of the present disclosure is directed to an electrochemical cell. The electrochemical cell includes a pair of bipolar plates and a membrane electrode assembly located between the pair of bipolar plates. The membrane electrode assembly comprises an anode compartment, a cathode compartment, and a proton exchange membrane disposed therebetween. The cell further includes a sealing surface formed in one of the pair of bipolar plates and a gasket located between the sealing surface and the proton exchange membrane. The gasket is configured to plastically deform to create a seal about one of the cathode compartment or the anode compartment.

Another aspect of the present disclosure is directed to an electrochemical cell. The electrochemical cell includes a pair of bipolar plates and a membrane electrode assembly located between the pair of bipolar plates. The membrane electrode assembly comprises an anode compartment, a cathode compartment, and a proton exchange membrane disposed therebetween. The electrochemical cell further comprises a sealing surface formed in one of the pair of bipolar plates, and the sealing surface comprises one or more protrusions. A compressed gasket located between the sealing surface and the proton exchange membrane, and the gasket is plastically deformed to create a seal about one of the cathode compartment or the anode compartment.

Yet another aspect of the present disclosure is directed to an electrochemical cell. The electrochemical cell includes a pair of bipolar plates and a membrane electrode assembly located between the pair of bipolar plates. The membrane electrode assembly comprises an anode compartment, a cathode compartment, and a proton exchange membrane disposed therebetween. The electrochemical cell further comprises a sealing surface formed in one of the pair of bipolar plates; and a gasket located between the sealing surface and the proton exchange membrane, wherein the gasket comprises at least one protrusion.

A further aspect of the present disclosure is directed to an electrochemical cell. The electrochemical cell includes a pair of bipolar plates and a membrane electrode assembly located between the pair of bipolar plates. The membrane electrode assembly comprises an anode compartment, a cathode compartment, and a proton exchange membrane disposed therebetween. The electrochemical cell further comprises a sealing surface formed in one of the pair of bipolar plates; and a compressed gasket located between the sealing surface and the proton exchange membrane. The gasket comprises at least one protrusion prior to compression.

An additional aspect of the present disclosure is directed to an electrochemical cell comprising: a pair of bipolar plates and a membrane electrode assembly located between the pair of bipolar plates, wherein the membrane electrode assembly comprises an anode, a cathode, and a proton exchange membrane disposed therebetween; a first seal defining a high pressure zone, wherein the first seal is located between the bipolar plates and configured to contain a first fluid within the high pressure zone; a second seal defining an intermediate pressure zone, wherein the second seal is located between the bipolar plates and configured to contain a second fluid within the intermediate pressure zone; and wherein the first seal is configured to leak the first fluid into the intermediate pressure zone when the first seal unseats.

Another aspect of the present disclosure is directed to an electrochemical cell comprising: a pair of bipolar plates and a membrane electrode assembly located between the pair of bipolar plates; a high pressure zone located between the bipolar plates containing a first fluid; an intermediate pressure zone located between the bipolar plates containing a second fluid; and a low pressure zone containing a third fluid; wherein the electrochemical cell is configured to transition between a first configuration, a second configuration, and a third configuration based on at least one of a closing force applied to the bipolar plates and an opening force produced by a pressure of at least one of the first fluid, second fluid, and third fluid.

Yet another aspect of the present disclosure is directed to a method of tuning the closing force of an electrochemical cell having a cascade seal configuration, the method comprising: providing an electrochemical cell having a plurality of seals in a cascade seal configuration; applying an initial closing force to the electrochemical cell based on the expected operating pressure; operating the electrochemical cell; monitoring the pressure of the electrochemical cell; and adjusting the closing force applied to the electrochemical cell based on the monitored pressure, wherein adjusting the closing force changes the pressure at which at least one of the plurality of seals unseats.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the present disclosure and together with the description, serve to explain the principles of the disclosure.

FIG. 12A is a top cross-sectional view of a part of an electrochemical cell, showing a gas diffusion layer and a reinforcement layer between the anode compartment and the PEM, according to an exemplary embodiment.

FIG. 12B is a top cross-sectional view of a part of an electrochemical cell, showing a reinforcement layer having a portion extending beyond the length of the gasket, according to another exemplary embodiment.

Reference will now be made in detail to the present exemplary embodiments of the present disclosure, examples of which are illustrated in the accompanying drawings. Wherever possible, the same reference numbers will be used throughout the drawings to refer to the same or like parts. Although described in relation to an electrochemical cell employing hydrogen, it is understood that the devices and methods of the present disclosure can be employed with various types of fuel cells and electrochemical cells, including, but not limited to electrolysis cells, hydrogen purifiers, hydrogen expanders, and hydrogen compressors.

Figure 1:
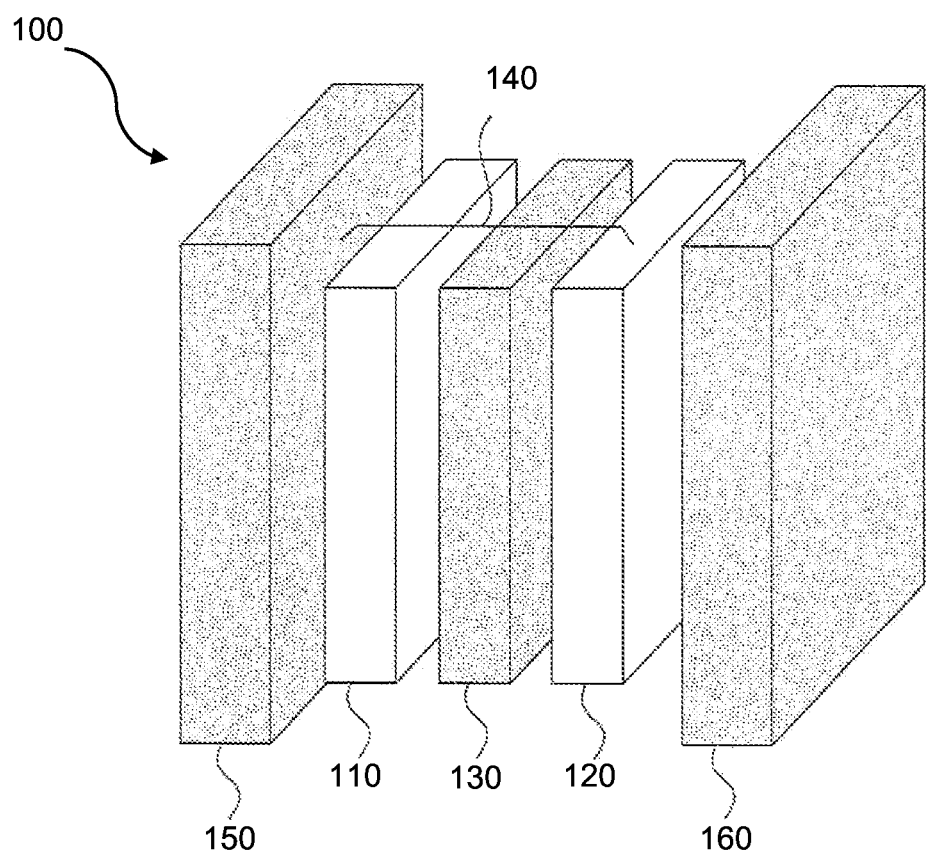
FIG. 1 is a side view of part of an electrochemical cell, showing various components of an electrochemical cell.

FIG. 1 shows an exploded side view of an electrochemical cell 100, according to an exemplary embodiment. Electrochemical cell 100 can comprise an anode 110, a cathode 120, and a proton exchange membrane (PEM) 130 disposed in between anode 110 and cathode 120. Anode 110, cathode 120, and PEM 130 combined can comprise a membrane electrode assembly (MEA) 140. PEM 130 can comprise a pure polymer membrane or composite membrane where other material, for example, silica, heteropolyacids, layered metal phosphates, phosphates, and zirconium phosphates can be embedded in a polymer matrix. PEM 130 can be permeable to protons while not conducting electrons. Anode 110 and cathode 120 can comprise porous carbon electrodes containing a catalyst layer. The catalyst material, for example platinum, can increase the reaction rate.

Electrochemical cell 100 can further comprise two bipolar plates 150, 160. Bipolar plates 150, 160 can act as support plates, conductors, provide passages to the respective electrode surfaces for the fuel, and provide passages for the removal of the compressed fuel. Bipolar plates 150, 160 can also include access channels for cooling fluid (i.e., water, glycol, or water glycol mixture). The bipolar plates can be made from aluminum, steel, stainless steel, titanium, copper, Ni—Cr alloy, graphite or any other electrically conductive material or combination of these materials in the form of alloys, coatings or claddings. Bipolar plates 150, 160 can separate electrochemical cell 100 from the neighboring cells in an electrochemical stack (not shown). For example, multiple electrochemical cells 100 can be linked in fluidic series to form a multi-stage electrochemical hydrogen compressor (EHC) or stacked in fluidic parallel to form a single-stage EHC.

In operation, according to an exemplary embodiment, hydrogen gas can be supplied to anode 110 through bipolar plate 150. An electric potential can be applied between anode 110 and cathode 120, wherein the potential at anode 110 is greater than the potential at cathode 120. The hydrogen at anode 110 can be oxidized causing the hydrogen to split into electrons and protons. The protons are electrochemically transported or "pumped" through PEM 130 while the electrons are rerouted around PEM 130. At cathode 120 on the opposite side of PEM 130 the transported protons and rerouted electrons are reduced to form hydrogen. As more and more hydrogen is formed at cathode 120, the hydrogen can be compressed and pressurized within a confined space.

Figure 2A:
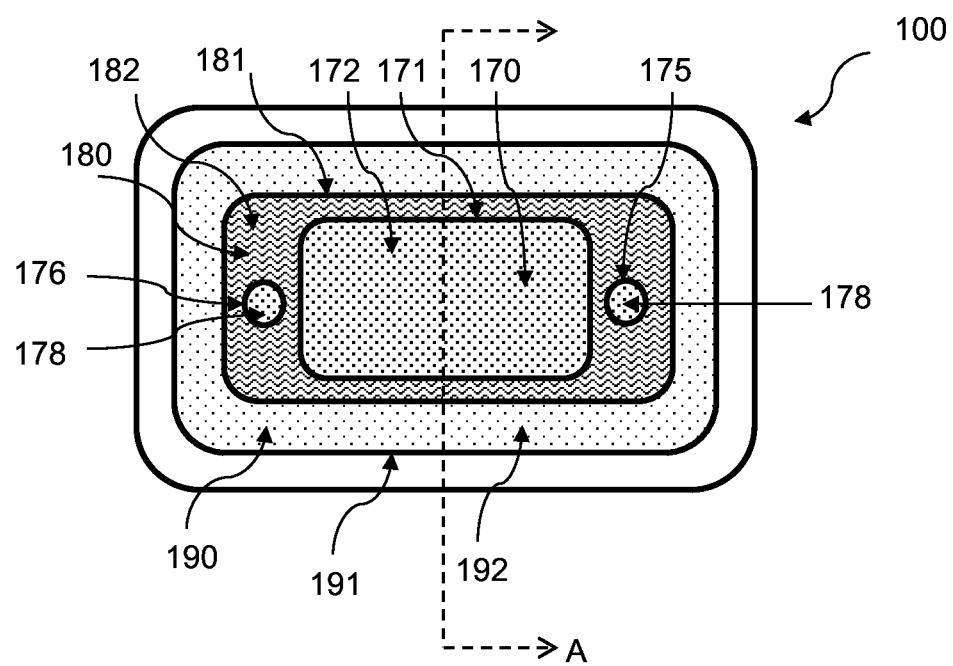
FIG. 2A is a front view of part of an electrochemical cell, showing the various seals and pressure zones of the cell, according to an exemplary embodiment.

Within electrochemical cell 100, a plurality of different pressure zones and a plurality of seals can define one or more different pressure zones. FIG. 2A shows the plurality of different seals and pressure zones within electrochemical cell 100. As shown in FIG. 2A, the plurality of seals can include a first seal 171, a second seal 181, and a third seal 191. First seal 171 can be contained entirely within second seal 181 and second seal 181 can be contained entirely within third seal 191. In addition, the plurality of seals can further include ancillary first seals 175, 176. Ancillary seal 175 and 176 can be located outside first seal 171, but within second seal 181.

First seal 171 can define high pressure zone 170 and be configured to contain a first fluid 172 (e.g., hydrogen) within high pressure zone 170. First seal 171 can delimit the outer boundaries of high pressure zone 170. High pressure zone 170 can correspond to the high pressure cathode 120 side of PEM 130. Hydrogen formed at cathode 130 can be collected in high pressure zone 170 and contained by first seal 171. Hydrogen within high pressure zone 170 can be compressed and, as a result, increase in pressure as more and more hydrogen is formed in high pressure zone 170. Hydrogen in high pressure zone 170 can be compressed to a pressure up to or greater than 15,000 psig.

Ancillary first seals 175, 176 can define two ancillary high pressure zones 177, 178 that can be in fluid communication with high pressure zone 170. Ancillary high pressure zones 177, 178 can be common passages configured to discharge the first fluid 172 from high pressure zone 170. Ancillary high pressure zones 177, 178 can be in fluid communication with common passages of adjacent electrochemical cells in a multi-cell electrochemical compressor.

Second seal 181 can define intermediate pressure zone 180 and be configured to contain a second fluid 182 within intermediate pressure zone 180. Second seal 181 can delimit the outer boundaries of intermediate pressure zone 180. Intermediate pressure zone 180 can correspond to the low pressure anode 110 side of PEM 130. Second fluid 182 (e.g., hydrogen or gas mixture containing hydrogen) supplied to anode 110 can be contained in intermediate pressure zone 180 by second seal 181 until it is oxidized and "pumped" across PEM 130 to cathode 120 and high pressure zone 170. Second fluid 182 within intermediate pressure zone 180 can vary based on the pressure being supplied. Regardless, second fluid 182 in intermediate pressure zone 180 can generally be lower pressure than first fluid 172 in high pressure zone 170.

Third seal 191 can define low pressure zone 190 and be configured to contain a third fluid 192 within low pressure zone 190. Third seal 191 can delimit the outer boundaries of low pressure zone 190. Low pressure zone 190 can comprise coolant fluid passages and third fluid 192 can comprise coolant fluid. Coolant fluid can include water, glycol, or combination thereof. In a high temperature system oil can be used as a coolant fluid. Third fluid 192 can generally be maintained at a pressure less than the pressure of second fluid 182 in intermediate pressure zone 180 and first fluid 172 in high pressure zone 170. Low pressure zone 190 can include an inlet passage and outlet passage (not shown) configured so third fluid 192 can be circulated through low pressure zone 190.

Figure 2B:
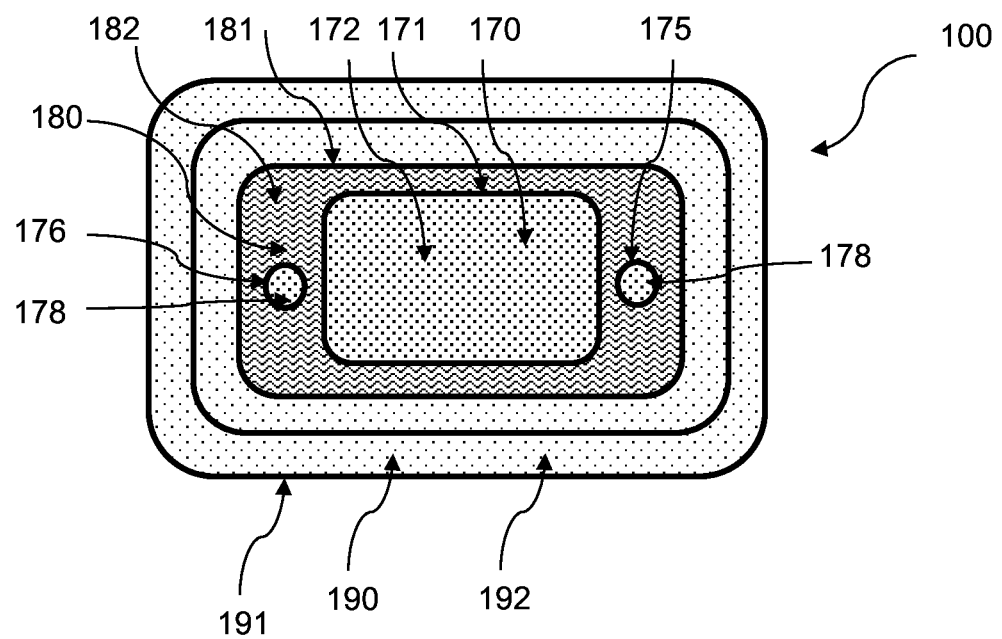
FIG. 2B is a front view of part of an electrochemical cell, showing the various seals and pressure zones of the cell, according to an exemplary embodiment.

In an alternate embodiment as shown in FIG. 2B, low pressure zone 190 can be located not within electrochemical cell 100, but rather in the area surrounding electrochemical cell 100 or a plurality of cells forming a stack. For example, low pressure zone 190 can contain nitrogen 192 forming a nitrogen blanket surrounding electrochemical cell 100 or in other embodiments surrounding a stack of cells. Other inert fluids such as argon or helium could also be used in place of nitrogen.

Figure 3A:
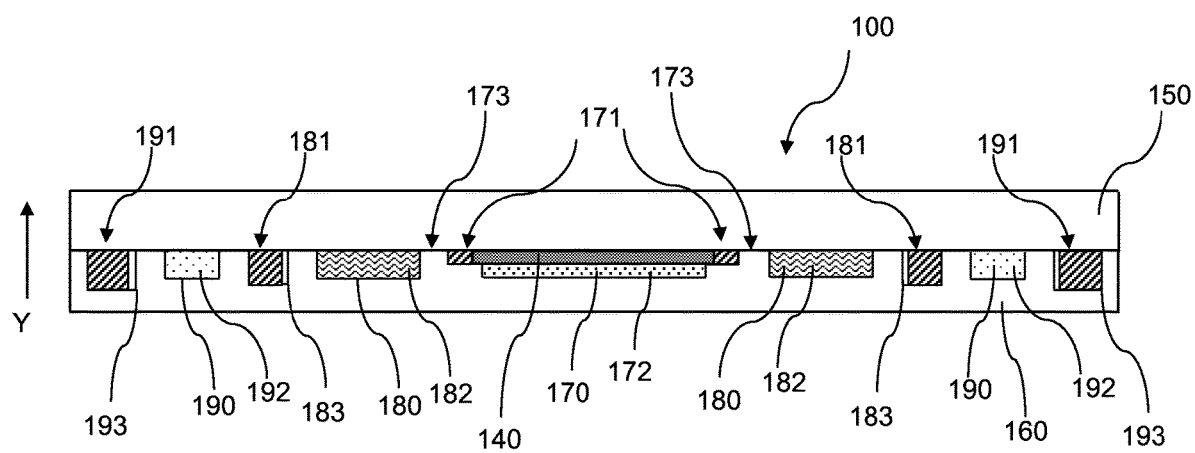
FIG. 3A is a cross-sectional view of part of an electrochemical cell, according to an exemplary embodiment.

FIG. 3A shows a cross-sectional view of electrochemical cell 100 along plane A of FIG. 2A. As described in FIG. 2A, electrochemical cell 100 can comprise MEA 140 and bipolar plates 150, 160. Between bipolar plates 150, 160 can be first seal 171 defining high pressure zone 170, second seal 181 defining intermediate pressure zone 180, and third seal 191 defining low pressure zone 190. In FIG. 3A, first seal 171, second seal 181, and third seal 191 can each be shown as two separate cross-sections of a single continuous seal as previously shown in FIG. 2A.

As shown in FIG. 3A, first seal 171 can be positioned against a first shoulder 173. First shoulder 173 can be configured to maintain the position of first seal 171 as pressure can build within high pressure zone 170. Pressure within high pressure zone 170 can apply an outward force against first seal 171. The height of first shoulder 173 can range from about 98% to about 25% of the uncompressed thickness of first seal 171.

In the particular embodiment shown in FIG. 3A there is no shoulder located interior to first seal 171. The absence of an interior shoulder as shown in FIG. 3A can allow for first seal 171 to be combined, joined, connected, or integral to MEA 140 or portion thereof. Having first seal 171 integral to MEA 140 can facilitate consistent, efficient, and streamlined assembly of electrochemical cell 100. However, in alternate embodiments an additional shoulder can be positioned interior to first seal 171 that can be configured to create a groove in which first seal 171 can be positioned.

Referring again to FIG. 3A, second seal 181 can be positioned in a second groove 183 formed between two shoulders in bipolar plate 160. To the interior of second groove 183 and second seal 181 can be intermediate pressure zone 180 and to the exterior of second groove 183 and second seal 181 can be low pressure zone 190. The depth of second groove 183 can range from about 98% to about 25% of the uncompressed thickness of second seal 181.

Third seal 191 as shown in FIG. 3A, can be positioned in a third groove 193 formed between two shoulders in bipolar plate 160. To the interior of third groove 193 and third seal 191 can be low pressure zone 190 and to the exterior third groove 193 and third seal 191 can be the surrounding environment of electrochemical cell 100. The depth of third groove 193 can range from about 98% to about 25% of the uncompressed thickness of third seal 191.

During assembly first seal 171, second seal 181, and third seal 191 between bipolar plate 150, 160 can be compressed by a predetermined percentage of their uncompressed thickness by selecting the appropriate height of their respective shoulders 173 or depth of their respective grooves, 183 and 193. First shoulder 173 and the shoulders forming second groove 183 and third groove 193 can act as a stop, as shown in FIG. 3A, for bipolar plate 150. By acting as a stop the possibility of over compressing the seals can be reduced. The elevation of first shoulder 173 and the shoulders forming second groove 183 and third groove 193 can be equal, such that, bipolar plate 150 can make contact with all the shoulder surfaces of bipolar plate 160 at once when the surfaces are parallel.

In alternate embodiments (not shown), second groove 183 and third groove 193 can be formed in bipolar plate 150 rather than bipolar plate 160. In another embodiment, second groove 183 can be formed in either bipolar plate 150, 160 while third groove 193 is formed in the other plate. In yet another embodiment, portions of second groove 183 and third groove 193 can be formed in both bipolar plates 150, 160.

Second groove 183 and third groove 193 can have a cross-sectional geometry that corresponds to the shape of second seal 181 and third seal 191. For example, the geometry of the seal and groove cross-section can be a square, rectangle, triangle, polygon, circle, or oval. In various embodiments the width of second seal 181 and third seal 191 can be less than the corresponding groove. The additional space in the grooves can allow for the expanding and contracting of the seals caused by temperature change, pressure change from the internal gases, and pressure change from the bipolar plate compression. As shown in FIG. 3A, typically the seals can be forced outwardly to the outer most position within the grooves because the seals experience higher pressure from the interior side versus the exterior side.

First seal 171, second seal 181, and third seal 191 can be a gasket, o-ring, or other sealing component. First seal 171, second seal 181, and third seal 191 can be made of an elastomeric or polymeric sealing material, for example, silicone, EPDM (ethylenepropylene-diene-monomer), fluoroelastomer, nitrile rubber (Buna-N), PTFE (polytetrafluoroethylene), polysulfone, polyetherimide, polychenylene sulfide, PEEK (polyether ether ketone), polyimide, PET (polyethylene terephthalate), PEN (polyethylene naphthalate), HDPE (high-density polyethylene), polyurethane, neoprene, acetal, nylon, polybutylene terephthalate, NBR (acrylonitrile-butadiene rubber), etc. In some embodiments, first seal 171, second seal 181, and third seal 191 can be made from metal material including, for example, tin, tin alloys, stainless steel, silver, platinum, and gold. The material of each seal can be different than the material of the other seals, the material can be the same for just two of the seals, or the material can be the same for all the seals.

Like the material, the thickness of each seal can be different than the other seals. Thickness can be measured along a vertical axis (Y) of electrochemical cell 100. As shown in FIG. 3A, the thickness of second seal 181 is greater than the thickness of first seal 171 and the thickness of third seal 191 is greater than the thickness of second seal 181. Consequently, the outermost seal, third seal 191, can have the greatest thickness and the innermost seal, first seal 171, can have the smallest thickness. For example, the thickness of first seal 171 can range between about 0.01 mm and about 1.0 mm, the thickness of second seal 181 can range between about 0.02 mm and about 2.0 mm, and the thickness of third seal 191 can range between about 0.03 mm and 3.0 mm.

For embodiments where the cross-sectional geometry of first seal 171, second seal 181, and third seal 191 can be a circle or oval, the thickness as described above can refer to the diameter of the circle or oval cross-section.

Figure 3B:
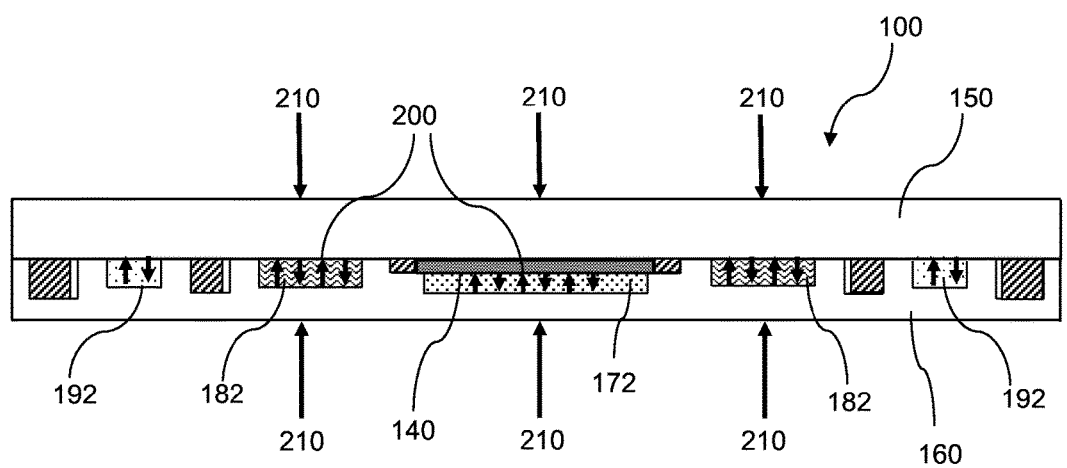
FIG. 3B is a cross-sectional view of part of an electrochemical cell, showing various forces, according to an exemplary embodiment.

As shown in FIG. 3B, during operation of electrochemical cell 100, the pressure of first fluid 172, second fluid 182, and third fluid 192 applied within each corresponding zone between bipolar plates 150, 160 can produce an opening force 200. Opening force 200 unopposed can cause bipolar plate 150, 160 to separate. In order to prevent opening force 200 from separating bipolar plates 150, 160, a closing force 210 can be applied to the plates to oppose and overcome opening force 200. It is understood that the pressure of first fluid 172, second fluid 182, and third fluid 192 would produce more forces than those represented by the plurality of arrows representing opening force 200. For example, lateral forces (not shown) perpendicular to opening force 200 would be produced as well as other forces pointing outwardly from each pressure zone in all possible directions.

Figure 4A:
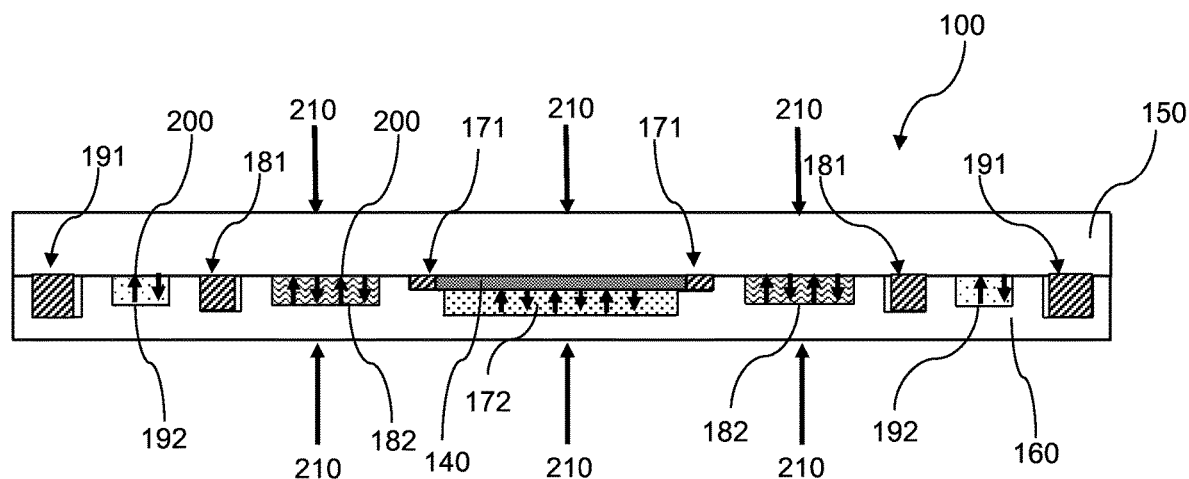
FIG. 4A is a cross-sectional view of part of an electrochemical cell, showing a first configuration, according to an exemplary embodiment.

FIG. 4A shows a cross-section of electrochemical cell 100 in a first configuration. Electrochemical cell 100 can maintain first configuration when closing force 210 is sufficient to overcome opening force 200 and hold bipolar plates 150, 160 substantially together. While in first configuration first seal 171, second seal 181, and third seal 191 can all maintain contact with both the top and bottom sealing surfaces of bipolar plate 150, 160, preventing leaking or bypassing of first fluid 172, second fluid 182, or third fluid 192. In this particular situation, all seals are fulfilling their function.

When electrochemical cell 100 is in first configuration, as described above, the actual measurement of the separation between the surfaces of bipolar plates 150, 160 can vary. For example, the separation can range from about 0.00 mm to about 0.01 mm, to about 0.05 mm, to about 0.10 mm.

Figure 4B:
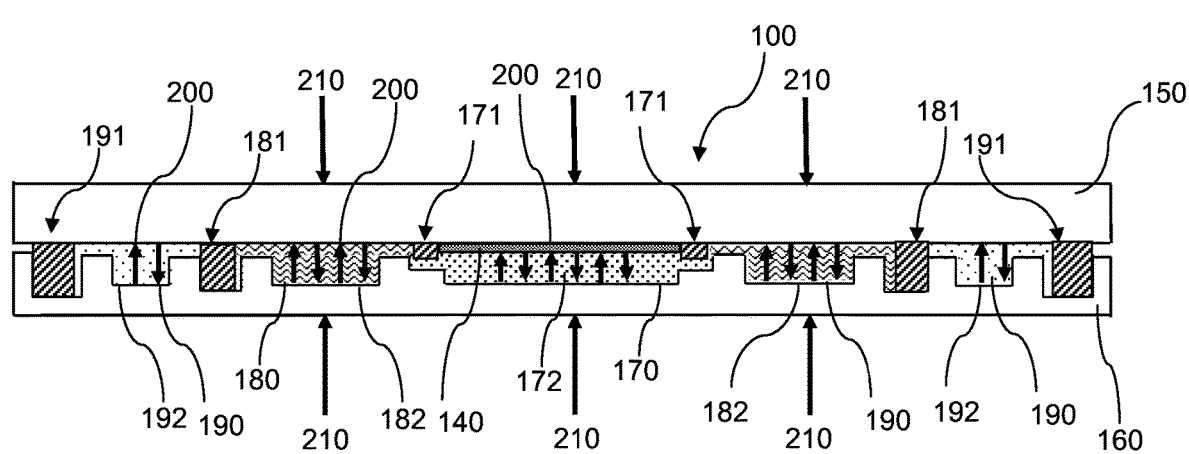
FIG. 4B is a cross-sectional view of part of an electrochemical cell, showing a second configuration, according to an exemplary embodiment.

FIG. 4B shows a cross-section of electrochemical cell 100 in a second configuration. Electrochemical cell 100 can change to second configuration when closing force 210 is reduced or opening force 200 is increased (e.g., first fluid 172 pressure increases) causing bipolar plates 150, 160 to separate. As shown in FIG. 4B, the first separation of bipolar plates 150, 160 can cause first seal 171 to unseat allowing the bypass of first fluid 172 from high pressure zone 170 into intermediate pressure zone 180. In the particular embodiment shown in FIG. 4B, first seal 171 is shown to unseat from bipolar plate 160 first, allowing the flow of first fluid 172 under and around first seal 171. However, it is understood that in alternate embodiments (not shown), first seal 171 can unseat from bipolar plate 150 first, allowing the flow of first fluid 172 over first seal 171 by passing between first seal 171 and MEA 140.

The flow of first fluid 172 from high pressure zone 170 to intermediate pressure zone 180 can be caused by the pressure differential between first fluid 172 and second fluid 182 and may travel along the path of least resistance. First seal 171 can be configured to be the first of the seals to unseat by having a thickness less than second seal 181 and third seal 191. This can allow third seal 191 and second seal 181 to maintain contact with both sealing surfaces preventing fluid from bypassing either seal despite the first separation of bipolar plates 150, 160 present in second configuration.

When electrochemical cell 100 is in second configuration, as described above, the actual measurement of the first separation that exists between bipolar plates 150, 160 can vary. For example, first separation can range from about 0.01 mm to about 0.05 mm, to about 0.10 mm, to about 0.25 mm.

Figure 4C:
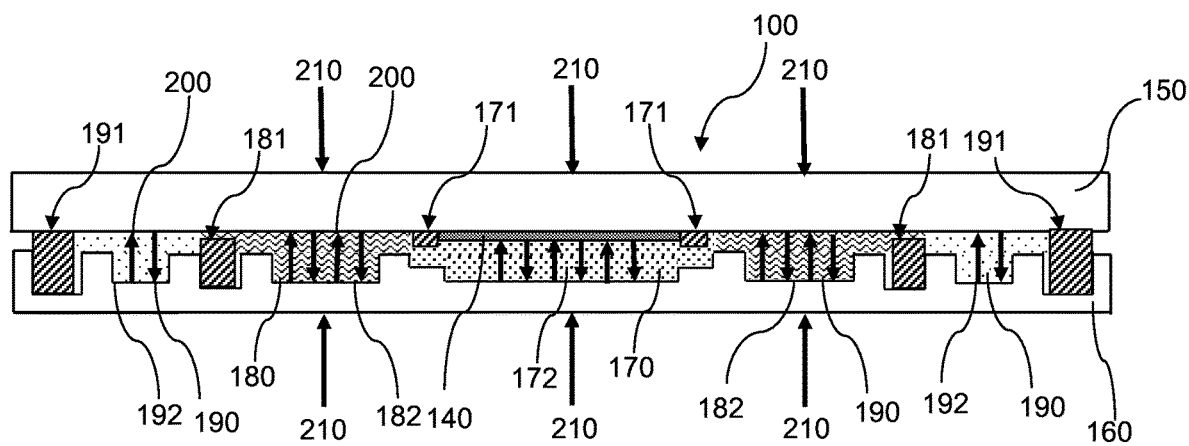
FIG. 4C is a cross-sectional view of part of an electrochemical cell, showing a third configuration, according an exemplary embodiment.

FIG. 4C shows a cross-section of electrochemical cell 100 in a third configuration. Electrochemical cell 100 can change to third configuration when closing force 210 is further reduced or opening force 200 is further increased causing bipolar plates 150, 160 to undergo second separation. As shown in FIG. 4C, second separation of bipolar plates 150, 160 can cause both first seal 171 and second seal 181 to unseat allowing the bypass of first fluid 172 from high pressure zone 170 and second fluid 182 from intermediate pressure zone 180 into low pressure zone 190. In the particular embodiment shown in FIG. 4C, second seal 181 is shown to unseat from bipolar plate 150 first, allowing the flow of second fluid 182 over second seal 181. However, it is understood that in alternate embodiments (not shown), second seal 181 can unseat from bipolar plate 160 first, allowing the flow of second fluid 182 under and around second seal 181.

The flow of second fluid 182 from intermediate pressure zone 180 to low pressure zone 190 can be caused by the pressure differential between second fluid 182 and third fluid 192. Second seal 181 can be configured to be the second seal to unseat by being thicker than first seal 171, but not as thick as third seal 191. Therefore, because third seal 191 can be thicker than both first seal 171 and second seal 181, third seal 191 can maintain contact with both sealing surfaces preventing flow from bypassing notwithstanding the second separation of bipolar plates 150, 160.

When electrochemical cell 100 is in third configuration, as described above, the actual measurement of the second separation can vary. For example, second separation can range from about 0.05 mm to about 0.25 mm, to about 0.50 mm.

Electrochemical cell 100 can be configured to transition from first configuration to second configuration and second configuration to third configuration based on the changing magnitude of closing force 210 and opening force 200 during operation. In addition, electrochemical cell 100 can also transition from third configuration to second configuration and second configuration to first configuration based on the changing magnitude of closing force 210 and opening force 200. It is contemplated that transitioning between first configuration, second configuration, and third configuration can occur continuously during the operation in response to the changing magnitude of closing force 210 and opening force 200.

In other embodiments, it is contemplated that the modulus of elasticity or durometer of the seals can be different instead of the thickness of the seals to enable the dispersed unseating of the seals. In yet another embodiment, both the thickness and the modulus of elasticity can be varied.

In certain embodiments, arrangement of the seals as described above can be classified as a cascade seal configuration. The cascade seal configuration can provide several advantages. For example, the cascade seal configuration can limit the potential of high pressure hydrogen escaping electrochemical cell 100 by providing seal redundancy in the form of three levels of sealing protection. Reducing the potential of hydrogen leaks can benefit safety and energy efficiency.

In addition, the cascade seal configuration can also allow for self-regulation of pressure. Self-regulation of pressure can be achieved because of the disparity in seal thickness and the resulting dispersed unseating of first seal 171, second seal 181, and third seal 191. For example, when electrochemical cell 100 is in second configuration as shown in FIG. 4B, first seal 171 can unseat allowing first fluid 172 to leak into intermediate pressure zone 180. First fluid 172 leaking into intermediate pressure zone 180 can bleed pressure from high pressure zone 170. By bleeding pressure from high pressure zone 170, opening force 200 can be reduced. The drop in opening force 200 can allow the first separation of bipolar plates 150, 160 to be reversed causing the transition of electrochemical cell 100 from second configuration to first configuration and the reseating of first seal 171.

First fluid 172 that leaks by first seal 171 can combine with second fluid 182 and be utilized by electrochemical cell 100, in effect, the leaked first fluid 172 can be recycled. A consequence of this leaking and subsequent recycling can be a loss in compression efficiency because the leaked hydrogen is "pumped" through PEM 130 twice. However, the potential loss in compression efficiency is still less than the overall loss in efficiency would be if the leaked hydrogen was not recovered an instead leaked to the exterior of electrochemical cell 100 and was lost.

In the event the bleeding of pressure from high pressure zone 170 is not enough to cause the transition from second configuration to first configuration, second separation may occur causing electrochemical cell to transition from second configuration to third configuration. In third configuration as shown in FIG. 4C, the second separation of bipolar plates 150, 160 can cause second seal 181 to unseat allowing second fluid 182 to leak into low pressure zone 190. Second fluid 182 leaking into low pressure zone 190 can bleed pressure from intermediate pressure zone 180. By bleeding pressure from intermediate pressure zone 180, opening force 200 can be further reduced. The drop in opening force 200 can allow the second separation of bipolar plates 150, 160 to be reversed causing the transition of electrochemical cell 100 from third configuration to second configuration and the reseating of at least second seal 181.

The consequence of bleeding second fluid 182 from intermediate pressure zone 180 to low pressure zone 190 can be a loss of cell efficiency. However, a benefit can be reducing the possibility of second fluid 182 (i.e., hydrogen gas) from escaping electrochemical cell 100.

In various embodiments, the pressure of third fluid 192 in low pressure zone 190 can be monitored. The unseating of second seal 181 can result in a pressure increase in low pressure zone 190 caused by the bleeding of second fluid 182 pressure into low pressure zone 190. Therefore, by monitoring the pressure of third fluid 192 the unseating of second seal 181 can be detected. In addition, electrochemical cell 100 can be configured to shut down before the pressure in low pressure zone 190 reaches a critical pressure. The critical pressure can be set just below the pressure at which third seal 191 would unseat allowing first fluid 172, second fluid 182, and third fluid 192 to escape electrochemical cell 100.

Monitoring the pressure can be accomplished in a variety of means. For example, a pressure transmitter could be configured to read the pressure in intermediate or low pressure zones 180 or 190, respectively, and when the pressure reaches the critical pressure set point the electrical potential to anode 110 and cathode 120 could be turned off preventing further hydrogen from getting "pumped" across PEM 130.

In other embodiments, the pressure of second fluid 182 in intermediate pressure zone 180 and first fluid 172 in high pressure zone 170 can also be monitored. For example, monitoring the pressure of second fluid 182 can allow the cell to be shut down before the pressure reaches the point where second seal 181 could unseat.

In various embodiments, when first fluid 172 or second fluid 182 (e.g., high or low pressure hydrogen) bleeds into low pressure zone 190 it can combine with third fluid 192 (e.g., coolant fluid) and can be carried out of low pressure zone 190 by the circulating third fluid 192.

Figure 5:
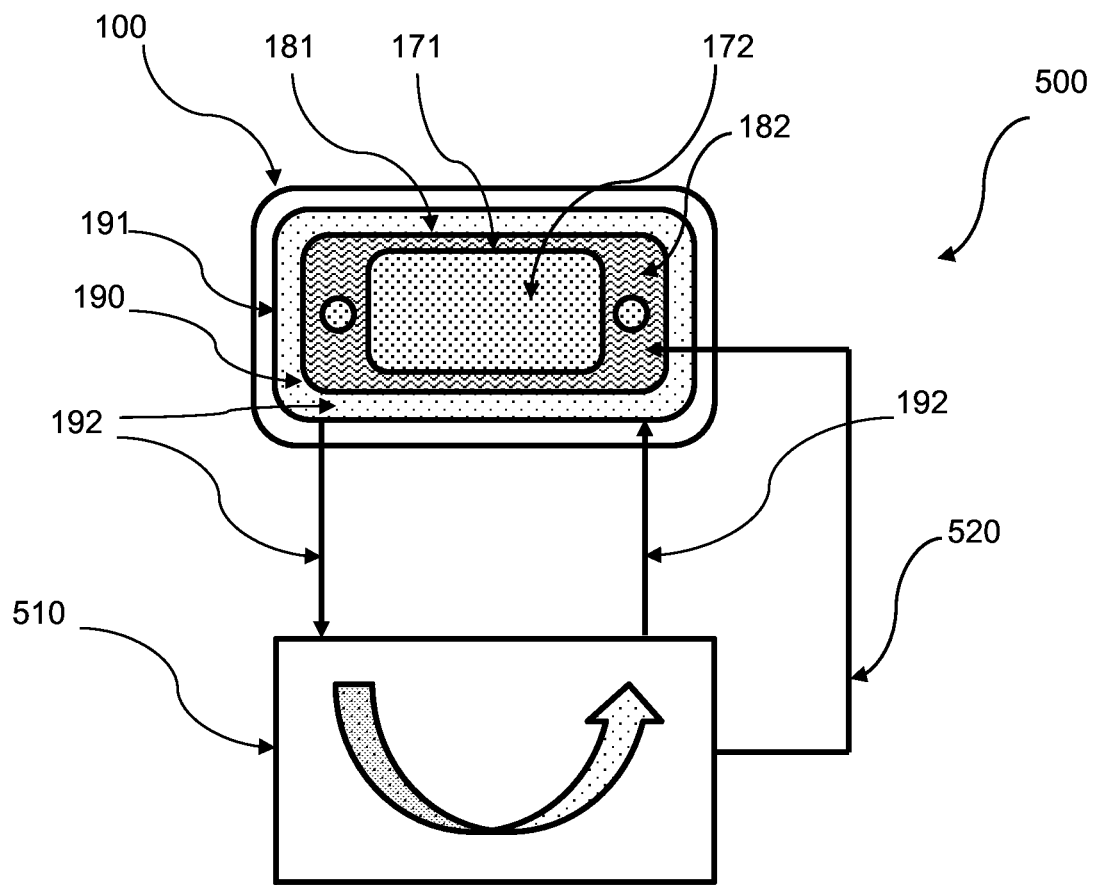
FIG. 5 is schematic diagram showing an electrochemical hydrogen reclamation system, according to an exemplary embodiment.

FIG. 5 shows an electrochemical hydrogen reclamation system (EHRS) 500, according to an exemplary embodiment. EHRS 500 can comprise an electrochemical cell 100 as described above having a cascade seal configuration. In addition to electrochemical cell 100, EHRS 500 can comprise a hydrogen reclamation apparatus 510. Apparatus 510 can be in fluid communication with low pressure zone 190 and intermediate pressure zone 180 of electrochemical cell 100. Apparatus 510 can receive third fluid 192 discharged from low pressure zone 190 and can be configured to recover at least a portion of any second fluid 182 contained in third fluid 192. After third fluid 192 passes through hydrogen reclamation apparatus 510, third fluid can be resupplied to low pressure zone 190. Any second fluid 182 recovered from third fluid 192 by hydrogen reclamation apparatus 510 can be reintroduced into intermediate pressure zone 180 by way of a recycle line 520 configured to fluidly connect hydrogen reclamation apparatus 510 and intermediate pressure zone 180. Recycling second fluid 182 can improve overall system efficiency. When second fluid 182 is hydrogen gas, for example, recycling second fluid 182 reduces the amount of new hydrogen required.

Hydrogen reclamation apparatus 510 can use a variety of technologies to separate second fluid 182 from third fluid 192. For example, dissolved gas separation from liquid coolant or hydrogen separation membrane from a nitrogen blanket.

In various embodiments, EHRS 500 can be configured to monitor the pressure of third fluid 192 in low pressure zone 190. By monitoring the pressure of third fluid 192 in low pressure zone 190, hydrogen reclamation apparatus 510 can be configured to only be engaged or energized when an increased pressure has been detected, which can indicate second seal 182 has unseated and second fluid has leaked into low pressure zone 190. By limiting the use of hydrogen reclamation apparatus the overall system efficiency can be increased.

Electrochemical cell 100 can operate at differential pressures higher than about 15,000 psig. For example, a differential pressure can be measured as the difference between second fluid 182 pressure (i.e., the inlet hydrogen pressure) which can range from about −10 psig to about 0 psig, or from about 0 psig to about 25 psig, about 100 psig, about 500 psig, about 1,000 psig, or about 6,000 psig and first fluid 172 pressure (i.e., compressed hydrogen pressure) which can range from the lower bound of the inlet hydrogen pressure to higher than about 15,000 psig. The differential pressure as described above can be the differential pressure experienced by first seal 171. Second seal 181 can experience differential pressure between second fluid 182 and third fluid 192 ranging between about 0 psig to about 25 psig, about 100 psig, about 500 psig, about 1,000 psig, or about 6,000 psig.

The cascade seal configuration describe above can enable closing force 210 to be tuned (i.e., increased or decreased) to a particular opening force 200. Traditionally closing force 210 can be set to deliver a preload on first seal 171, second seal 181, and third seal 191 sufficient to withstand the expected opening force 200 caused by the internal pressure. However, by changing the preload or adjusting closing force 210 during operation of electrochemical cell 100, the pressure at which first seal 171, second seal 181, and third seal 191 unseat can be tuned so they each unseat and leak at a preferred particular pressure.

The tuning capability of electrochemical cell 100 can be used to enhance the safety of the device. As described above, unseating of the seals enables the bleeding of high pressure and the reseating of the seals. Therefore, by tuning closing force 210, electrochemical cell can be configured so that the seals are the first component to react to a pressure increase instead of another component that's failure could result in release of hydrogen.

Figure 6:
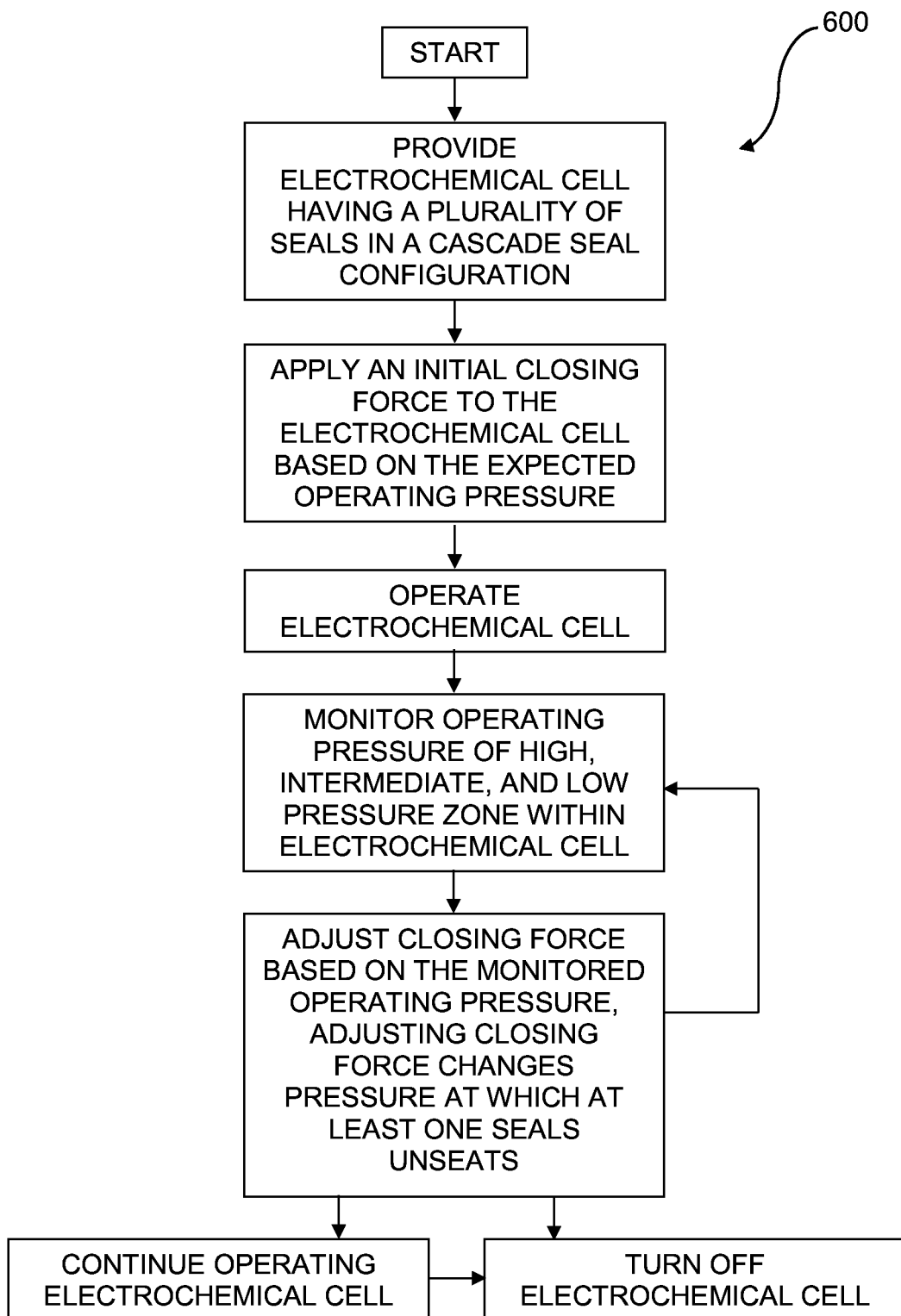
FIG. 6 is a flow diagram illustrating a method of controlling the pressure within an electrochemical cell, according to an exemplary embodiment.

FIG. 6 shows a flow chart 600, for a method of tuning the seals of electrochemical cell 100. The method can include providing electrochemical cell 100, which can have a plurality of seals in a cascade seal configuration as described above. Next, the method can include applying an initial closing force to the electrochemical cell based on the expected operating pressure. After applying an initial closing force the cell can be energized and operation can begin. During operation the pressure of the low, intermediate, and high pressure zones within electrochemical cell 100 can be monitored continuously or intermittently. Based on the monitored pressures and the resulting opening force the closing force can be adjusted. Adjusting the closing force can change the pressure at which at least one of the plurality of seals unseats. This process can continue throughout the operation of the electrochemical cell or can be configured to run for only a finite period of time initially at startup. As required, operation of electrochemical cell can be ended.

It is contemplated that, in some embodiments, first seal 171 can unseat due to the pressure of first fluid 172 in high pressure zone 170 without separation of plates 150, 160. Similarly, it is contemplated that both first seal 171 and second seal 181 can unseat due to the pressure of first fluid 172 in high pressure zone 170 and second fluid 182 in intermediate pressure zone 182 without separation of plates 150, 160. In these embodiments, pressure of at least first fluid 172 and, in certain embodiments, both first fluid 172 and second fluid 182 can be monitored. Based on the monitored pressures, the closing force can be adjusted. Closing force 210 can be further tuned based on the geometry and/or thickness of first seal 171, second seal 181, and third seal 191 relative to first shoulder 173, second groove 183, and third groove 193, respectively.

Figure 7:
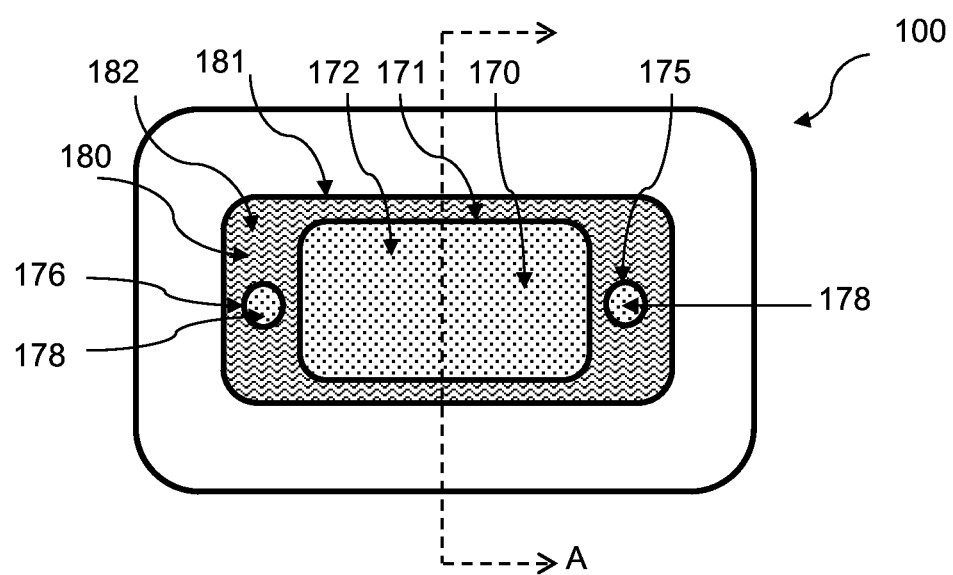
FIG. 7 is a front view of part of an electrochemical cell, showing the various seals and pressure zones of the cell, according to another embodiment.

More or fewer seals and pressure zones are contemplated. For example, in another embodiment as shown in FIG. 7, electrochemical cell 100 can comprise a first seal 171 and second seal 181. Accordingly, electrochemical cell 100 as shown in FIG. 7 can comprise a first seal 171 defining a high pressure zone 170. First seal 171 can be located between the bipolar plates 150, 160 and configured to contain a first fluid 172 with high pressure zone 170. Electrochemical cell 100 can further comprise a second seal 181 defining an intermediate pressure zone 180. Second seal 182 can be located between bipolar plates 150, 160 and configured to contain second fluid 182 within intermediate pressure zone 180. First seal 171 can be contained entirely with second seal 181. Electrochemical cell 100 can further comprise ancillary first seals 175, 176. Ancillary seal 175 and 176 can be located outside first seal 171, but within second seal 181.

In addition, with regard to electrochemical cell 100, first fluid 172 can be at a higher pressure than second fluid 182. First seal 171 and second seal 181 can have a generally rectangular cross-section. The thickness of second seal 181 can be greater than first seal 171. First seal 171 can be configured to leak first fluid 172 into intermediate pressure zone 180 when first seal 171 unseats. In such an embodiment, electrochemical cell 100 can be configured to shutdown prior to the unseating of second seal 181 reducing the possibility of second fluid 182 leaking from intermediate pressure zone 180.

First seal 171 and second seal 181 within electrochemical cell 100 can be configured to remain seated preventing the leaking of first fluid 172 and second fluid 182 when a closing force being applied to bipolar plates 150, 160 is greater than the opening force within bipolar plates 150, 160. When closing force applied to bipolar plates 150, 160 approaches the opening force within bipolar plates 150, 160, first seal 171 can be configured to unseat before second seal 181 unseats causing first fluid 172 to leak past first seal 171 into intermediate pressure zone 180. First fluid 172 that leaks past first seal 171 can combine with second fluid 182 and be recycled.

In another example (not shown), electrochemical cell 100 can comprise first seal 171, second seal 181, third seal 191, and a fourth seal. In this example, the fourth seal can be contained entirely within third seal 191, between second seal 181 and third seal 191. That is, the fourth seal can define a fourth pressure zone which can be, for example, a vacuum or hydrogen reclamation zone containing a fluid having a pressure that is lower than the pressure of both second fluid 182 and third fluid 192. The fourth seal can have a thickness that is greater than the thickness of second seal 181. In this manner, second seal 181 can be configured to leak second fluid 182 into the fourth pressure zone when second seal 181 unseats.

Figure 8:
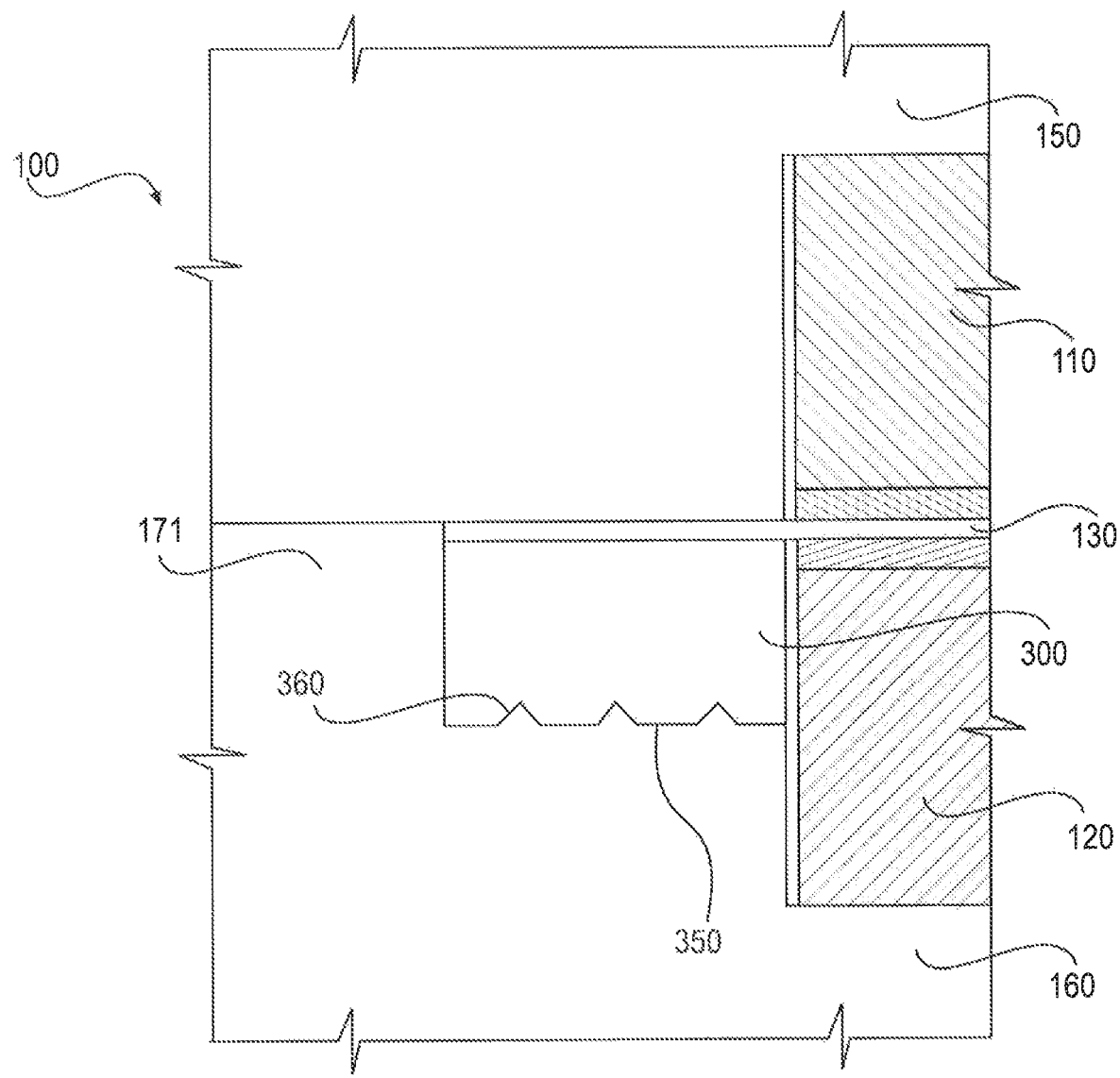
FIG. 8 is a cross-sectional view of a part of an electrochemical cell, showing a sealed cathode compartment, according to an exemplary embodiment.
Figure 11:
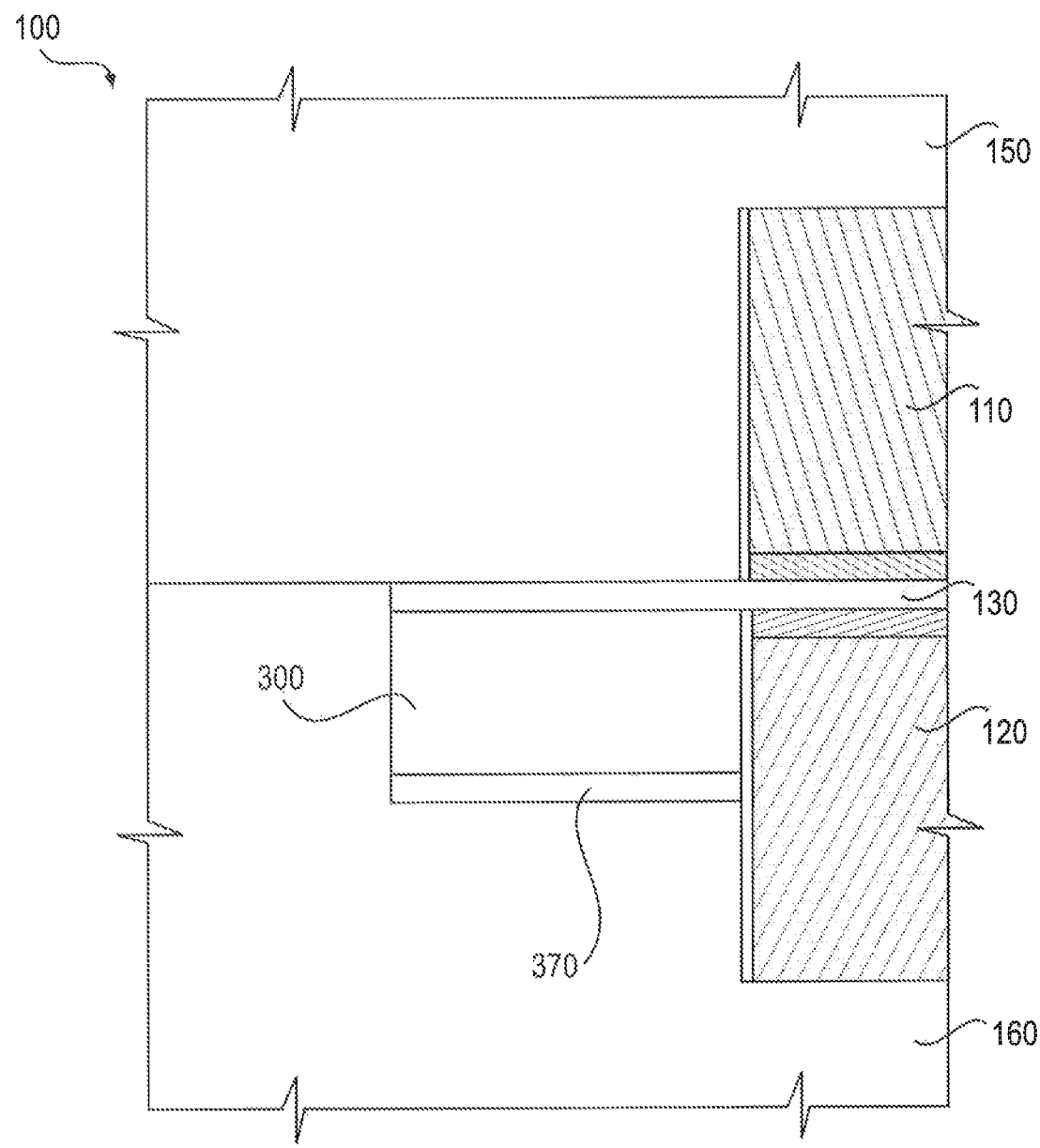
FIG. 11 is a top cross-sectional view of a part of an electrochemical cell, showing a sealed cathode compartment, according to another embodiment.

FIGS. 8 and 11 illustrate exemplary embodiments of first seal 171. As discussed above, first seal 171 defines high pressure zone 170, which can be configured to contain a first fluid 172 (e.g., hydrogen) within high pressure zone 170. High pressure zone 170 can correspond to the high pressure cathode side 120 of PEM 130. Hydrogen formed at cathode 120 can be collected in high pressure zone 170 and contained by first seal 171. In some embodiments, hydrogen in high pressure zone 170 can have a pressure greater than 15,000 psig.

As will be discussed in more detail below, first seal 171 can include an assembly of components capable of sealing a compartment of electrochemical cell 100, and withstanding pressures in excess of 15,000 psig for long periods of time (e.g., greater than 10 years) and withstand many pressure cycles (e.g., greater than 10,000 cycles). In the exemplary embodiments, the sealing components including a gasket 300; a sealing surface 350 formed in one of bipolar plate 150, 160; and PEM 130. First seal 171 can be formed by compression of gasket 300 against sealing surface 350, and compression of PEM 130 against gasket 300. Other seals can include one or more features below and may be used in conjunction with first seal 171. Additionally, it will be understood that the features described below can be used to seal other components of the electrochemical cell and/or can be used in cells that to not employ the cascade seal configuration.

FIG. 8 is a cross-sectional view of electrochemical cell 100, according to an exemplary embodiment. As illustrated in FIG. 8, electrochemical cell 100 includes an anode 110 compartment, a proton exchange membrane (PEM) 130, and a cathode compartment 120 disposed between bipolar plates 150, 160. Sealing surface 350 can be formed in one of bipolar plates 150, 160, and located adjacent a perimeter of the compartment to be sealed. In FIG. 8, sealing surface 350 is located outside a perimeter of cathode compartment 120. Gasket 300 is positioned between sealing surface 350 and PEM 130.

During assembly of electrochemical cell 100, gasket 300 can be compressed against sealing surface 350 of bipolar plate 160 and PEM 130 to form first seal 171, second seal 181, or third seal 191. Gasket 300 can be configured such that, under compression by sealing surface 350, gasket 300 primarily undergoes plastic deformation. In particular, gasket 300 can be made from a "hard" material with a creep modulus and compressive yield strength greater than the required sealing pressure, but lower than the compressive yield strength of sealing surface 350. For example, gasket 300 can be made from a material having a creep modulus and/or compressive yield strength in a range sufficient to withstand pressure greater than 12,000 psi. Gasket 300 can have a yield strength higher than PEM 130, so that a seal is formed by compression of the soft PEM material against the surface of the hard gasket material. Alternately, gasket 300 can be made of a material having a compressive yield strength less than the required sealing pressure. A compressive pressure greater than the required sealing pressure is still able to be applied to gasket 300 due to the gasket being constrained by the wall of bipolar plate 160 and the protrusions on sealing surface 350.

In some embodiments, gasket 300 can be made of a polymeric sealing material including, but not limited to, Torlon®, polyether ether ketone (PEEK), polyethyleneimine (PEI), polycarbonate, polyimide, PET (polyethylene terephthalate), PEN (polyethylene naphthalate), HDPE (high-density polyethylene), polyurethane, acetal, nylon, polybutylene terephthalate and polysulfone. The polymer gasket materials can be acid resistant and should not leach materials that are harmful to the operation of electrochemical cell 100. In other embodiments, gasket 300 can be made from metal material including, but not limited to, tin, tin alloys, stainless steel, silver, platinum, and gold. The metal gasket materials can be corrosion resistant or have a corrosion resistant coating. In yet other embodiments, gasket 300 can be made of a composite of polymeric and/or metallic materials.

The dimensions of gasket 300 including the shape, thickness, and width of gasket 300 can vary, and can be based on the dimensions of electrochemical cell 100. In some embodiments, gasket 300 can have a substantially rectilinear cross-section with a thickness in the range of 0.25 inches to 0.001 inches. The thickness is measured along a vertical axis (Y) of cell. In these embodiments, gasket 300 can have a width to thickness aspect ratio in the range of 3:1 to more than 25:1.

Sealing surface 350 can include one or more features configured to apply sufficient pressure to plastically deform gasket 300 and create a seal. For example, sealing surface 350 can be a surface having one or more protrusions 360. In certain embodiments, compressive forces are applied to create sufficient stresses that cause the gasket to plastically deform and create a sealing surface. The protrusions 360 can function as stress concentrators and when pressed into the seal, and can create localized stress in the material higher than a target sealing pressure. Although three protrusions 360 are depicted, it will be understood that a greater or lesser number of protrusions may be provided.

Figure 9A:
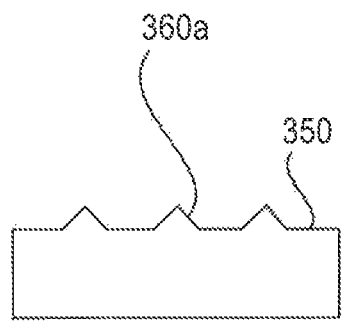
FIGS. 9A-9C are cross-sectional views showing a sealing surface of a bipolar plate including protrusions having various configurations, according to exemplary embodiments.
Figure 9B:
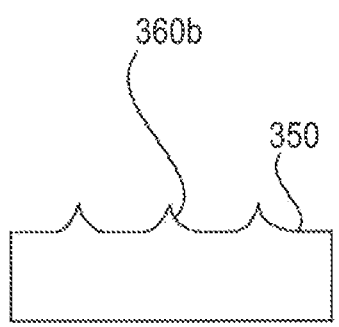
Figure 9C:
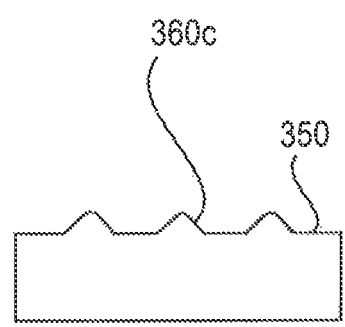

The protrusions can have any known geometry, sufficient to deform gasket 300. For example, the protrusions can have a triangular configuration 360a (FIG. 9A), a cusp configuration 360b (FIG. 9B), or a flat blade configuration 360c (FIG. 9C). Other contemplated geometries for the protrusions include a partially rounded configuration, and a semi-circular configuration. It is contemplated that the configuration of each protrusion can be different than the configuration of the other protrusions, or the same for all the protrusions. In FIGS. 9A-C the exemplary protrusions are shown having the same height, but any one or more of could be configured to be taller or shorter than the rest. For example, every other protrusion may have the same height, the outer most protrusions may be taller and at the same height, the one or more inner protrusions may be taller, the protrusions may descend or ascend in height moving from left to right or right to left, or every protrusion may be at a different height. Embodiments having protrusions of different heights may be configured to better account for variability in machining tolerances of the other components.

Protrusions 360 and gasket 300 can be positioned relative to each other to leave a small gap between protrusions 360 and a top surface of a portion of gasket 300. During assembly, protrusions 360 can be compressed against gasket 300 causing each protrusion 360 to press into and seal with gasket 300. As further compressive forces are applied to bipolar plates 150, 160, sufficient stresses can be formed to cause gasket 300 to plastically deform and create a seal.

In the exemplary embodiment, sealing surface can be a knife edge sealing surface having one or more protrusions machined to a sharp knife edge. During assembly, these protrusions can be compressed against gasket 300 causing the knife edge of each protrusion to press into and seal with gasket 300. As further compressive forces are applied to bipolar plates 150, 160, sufficient stresses can be formed to cause gasket 300 to plastically deform and create a seal.

Gasket 300 can be compressed by a predetermined percentage of its uncompressed thickness by selecting the appropriate height and width dimensions for protrusions 360. In certain embodiments, protrusions 360 can be arranged so as to deliberately create a non-uniform stress field within the gasket, where portions of the stress field are greater in magnitude than the level of gas pressure being sealed.

Figure 9D:
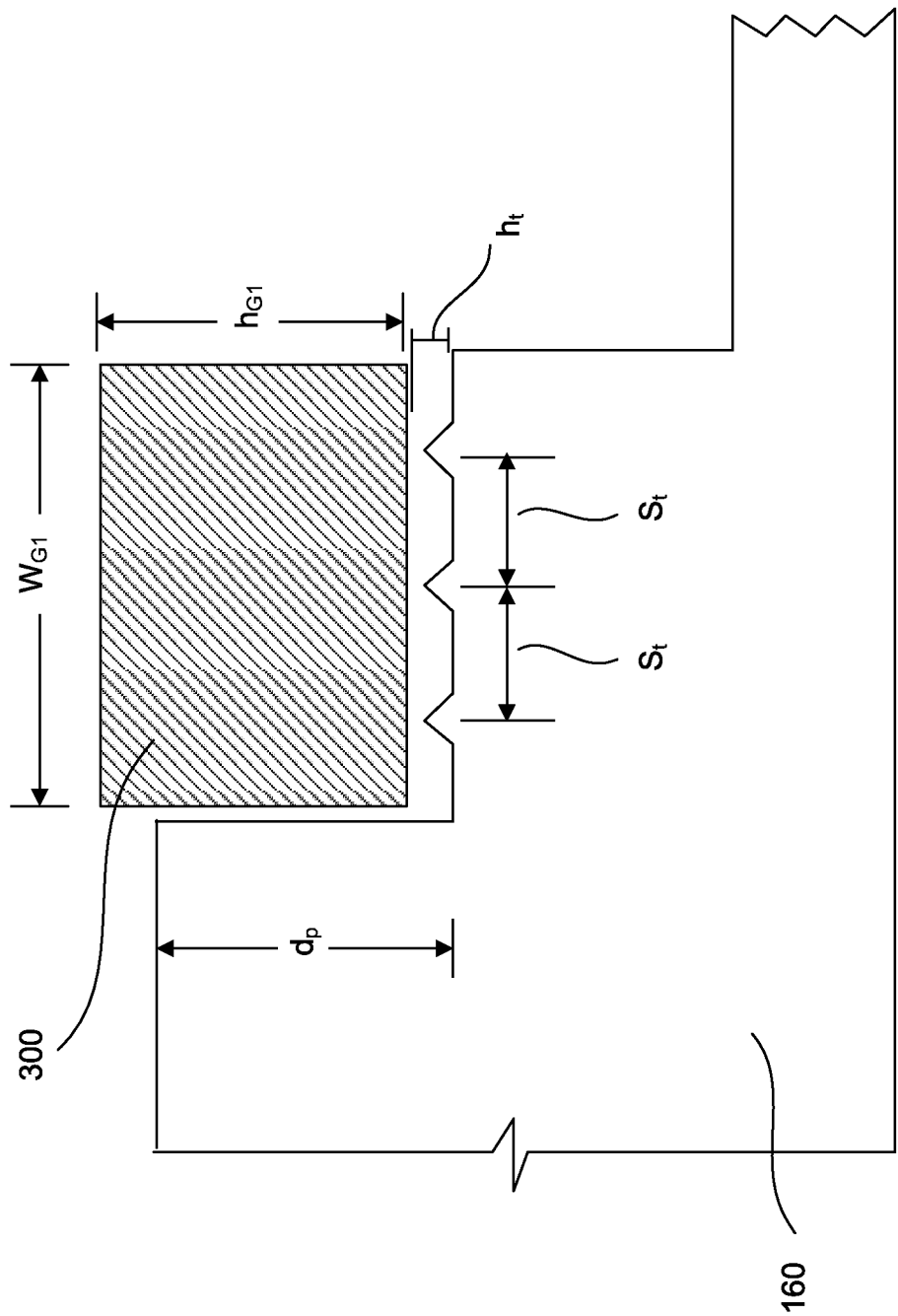
FIGS. 9D and 9E are cross-sectional views of the sealing surface of a bipolar plate depicted in FIG. 9A, in an uncompressed and compressed state, respectively.
Figure 9E:
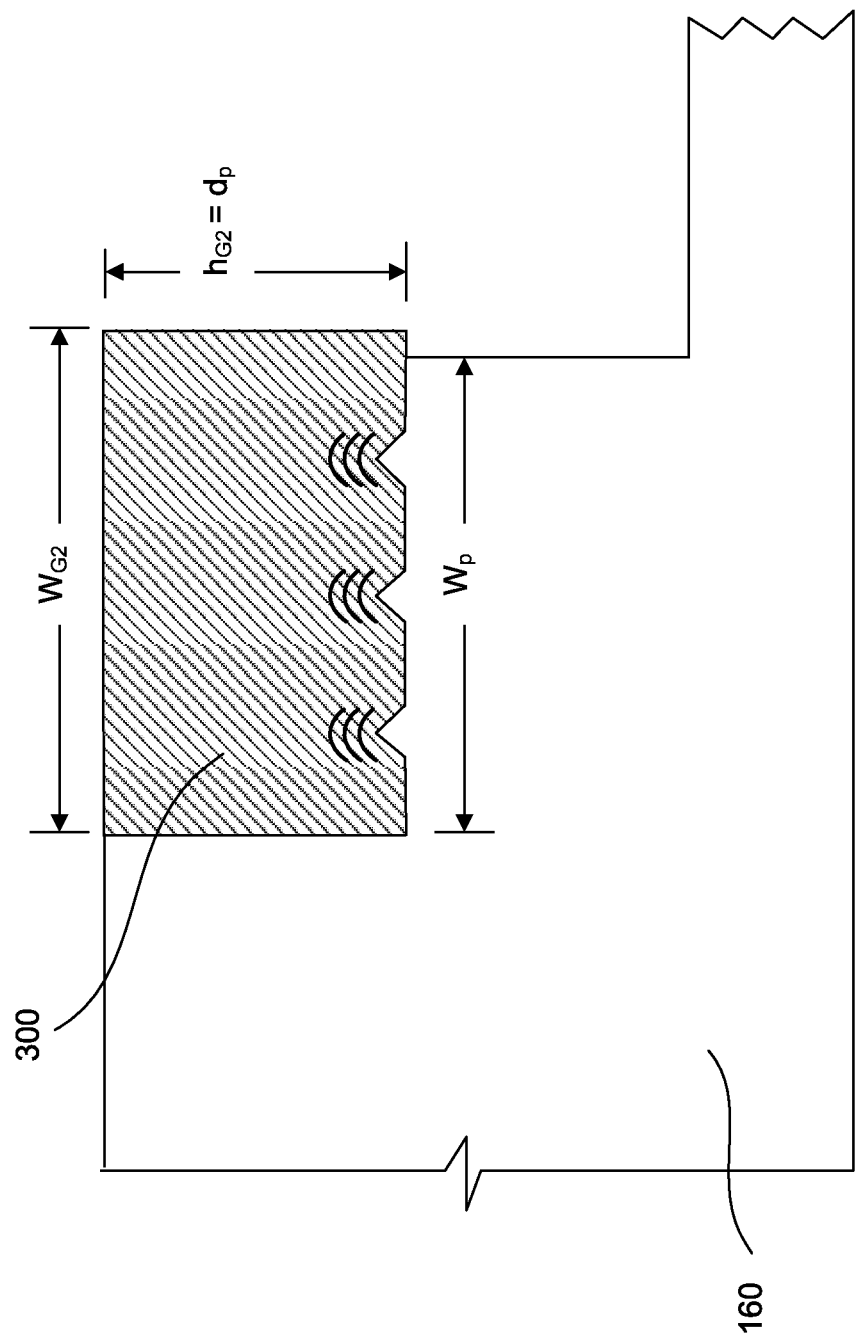

FIGS. 9D and 9E provide a cross-section view of the sealing surface of a bipolar plate depicted in FIG. 9A, in an uncompressed and compressed state, respectively. In FIG. 9D, the width of gasket 300 is represented by $W_{G1}$, the height of gasket 300 is represented by $h_{G1}$, and the pocket depth in bipolar plate 160 is represented by $d_p$. With respect to protrusions 360, the height is represented by $h_t$, the spacing between the protrusions 360 is represented by $S_t$.

In certain embodiments, the ratio of $h_{G1}:d_p$ can range from 0.8:1 to 1.5:1, such as from 0.9:1 to 1.3:1, 0.9:1 to 1.4:1, from 1:1 to 1.3:1, and from 1:1 to 1.2:1. In addition, the ratio of $h_t:h_{G1}$ can range from 0.05:1 to 0.75:1, such as from 0.1:1 to 0.7:1, from 0.15:1 to 0.65:1, from 0.2:1 to 0.6:1 and from 0.25:1 to 0.6:1. Further, the ratio of $S_t:h_t$ can range from 0.5:1 to 10:1 such as from 0.1:1 to 10:1, from 0.2:1 to 8:1, from 0.5:1 to 6:1, and from 1:1 to 5:1. In further embodiments, the ratio of $h_{G1}:d_p$, $h_t:h_{G1}$, and $S_t:h_t$ can all be within at least one range disclosed above.

In FIG. 9E, the width of gasket 300 is represented by $W_{G2}$, the height of gasket 300 is represented by $h_{G2}$, and, in this embodiment in which the gasket is compressed, the pocket depth $d_p$ in bipolar plate 160 is equal to $h_{G2}$. In this embodiment, the pocket width is represented by $W_p$.

In certain embodiments, the ratio of $W_{G1}:W_p$ ranges from 0.25:1 to 2:1 such as from 0.5:1 to 2:1, from 0.75:1 to 2:1, from 1:1 to 2:1, and from 0.25:1 to 1:1. In addition, the ratio of $W_p:S_t$ can range from 1:1 to 20:1, such as from 1:1 to 15:1, from 1:1 to 10:1, from 5:1 to 20:1, and from 5:1 to 10:1. In further embodiments, the ratio of $W_{G1}:W_p$ and $W_p:S_t$ can all be within at least one range disclosed above.

Figure 9F:
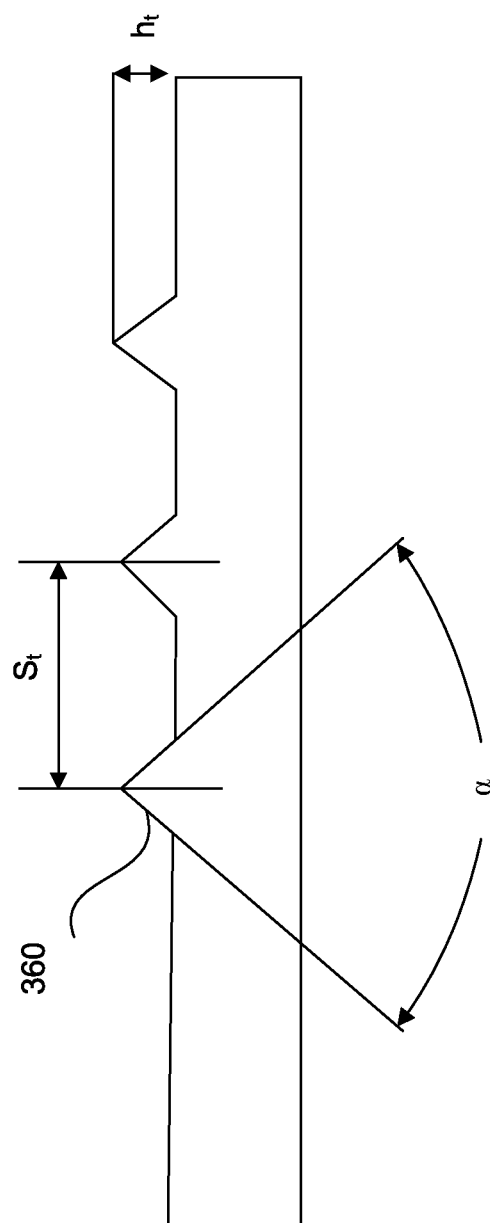
FIG. 9F is a cross-sectional view of the sealing surface of a bipolar plate depicted in FIG. 9A containing dimensional information.

FIG. 9F illustrates a set of protrusions 360 having be a certain height $h_t$, spaced a certain distance $S_t$ from one another, and the sloped sides of each protrusion can form an angle α. According to various embodiments, the height of the protrusions 360 can range from 0.001 to 0.020 inches, such as from 0.003 to 0.020 inches, from 0.005 to 0.015 inches, and from 0.006 to 0.010 inches. According to various embodiments, the distance between protrusions can range from 0.01 to 0.2 inches, such as from 0.05 to 0.1 inches, from 0.02 to 0.05 inches, and from 0.02 to 0.03 inches. According to various embodiment, angle α can range from 55 to 125 degrees, such as from 60 to 120 degrees, from 65 to 115 degrees, from 75 to 105 degrees, and from 80 degrees to 100 degrees. In further embodiments, the height of the protrusions, distance between the protrusions, and angle of the protrusions can all be within at least one range disclosed above.

Figure 10:
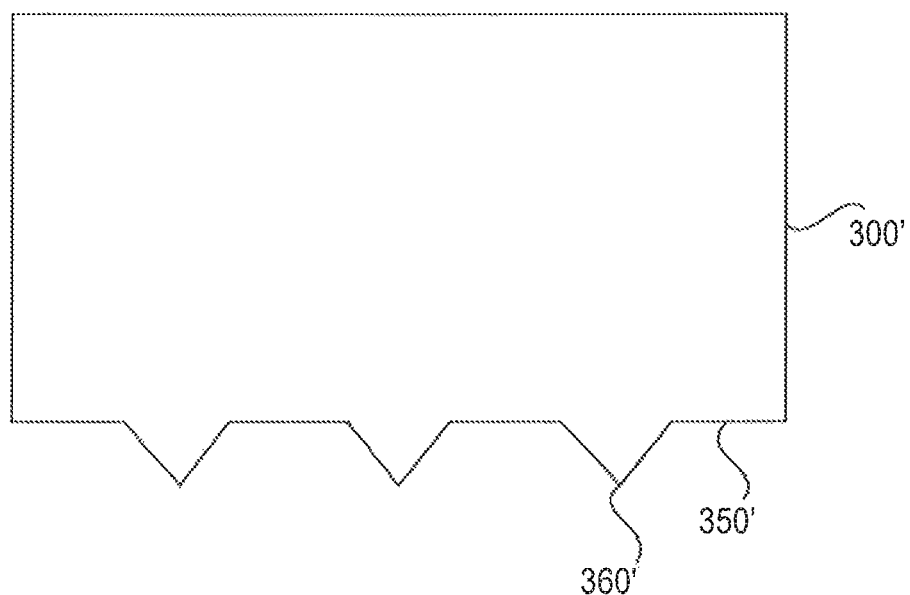
FIG. 10 is a cross-sectional view of a gasket having protrusions, according to an exemplary embodiment.

In alternative embodiments, sealing surface 350' can be provided on gasket 300' (FIG. 10) instead of one of the bipolar plates. According to this embodiment, bipolar plate 160 can have a flat surface, and the portion of gasket 300' in contact with bipolar plate 160 can have sealing surface 350' including protrusions 360'. As in the embodiment described above, protrusions 360' can be machined to a sharp knife edge. Upon assembly of electrochemical cell 100, sealing surface 350' can be compressed against bipolar plate 160 to plastically deform protrusions 360' of gasket 300'. As these protrusions plastically deform, the knife edge of each protrusion can press into and seal with sealing surface 350'.

Referring back to FIG. 8, PEM 130 can be compressed against a side of gasket 300 that is opposite of sealing surface 350. In the exemplary embodiment, PEM 130 can be formed of a material having a yield strength that is lower (e.g., softer) than gasket 300. In this arrangement, a seal is formed by the compression of the soft PEM material against the surface of the hard gasket material.

In alternative embodiments, a membrane or a membrane-like material can be provided on at least one side of gasket 300. For example, a membrane or membrane-like material 370 can be provided between bipolar plate 160 and gasket 300 (FIG. 11). In some embodiments, membrane 370 can also be provided between gasket 300 and PEM 130 (e.g., on both sides of gasket 300).

Membrane 370 can be a "soft gasket," used in place of the knife-edge seal. In particular, membrane 370 can be formed of a "soft" material having a creep modulus and compressive yield strength that is lower than gasket 300. A seal can be formed by compression of membrane 370 against gasket 300 and bipolar plate 160. Where a membrane 370 is provided on both sides of gasket 300, a seal can also be formed by compression of membrane 370 against gasket 300 and PEM 130.

In some embodiments, membrane 370 can be bonded to gasket 300 by adhesive materials or other known bonding methods. Such methods include hot-pressing or ultrasonic welding. Bonding of membrane 370 to gasket 300 can aid in assembly of electrochemical cell 100, and can improve the seal between membrane 370 and gasket 300.

In some embodiments, the perimeter of anode compartment 110 can extend beyond the perimeter of the sealed cathode compartment 120 (FIGS. 12A-12D). In those embodiments, a thin gas diffusion layer 380 can be provided between PEM 130 and the portion of anode compartment 110 that extends beyond the perimeter of cathode compartment 120. In the exemplary embodiment shown in FIGS. 12A-12D, gas diffusion layer 380 is disposed along a side of PEM 130 that is opposite to gasket 300.

Gas diffusion layer 380 can serve as diffusion media enabling the transport of gases and liquids within the cell, can aid in the removal of heat and process water from the cell, and in some cases, can provide some mechanical support to PEM 130. Gas diffusion layer 380 can comprise a woven or non-woven carbon or other conductive material cloth. In certain embodiments, "frit"-type densely sintered metals, screen packs, expanded metals, metal foam, or three-dimensional porous metallic substrates can be used in combination with or as a replacement for at least a portion of gas diffusion layer 380 to provide structural support.

Also included in these embodiments is a reinforcement layer 385, which can have any size, shape, and/or configuration sufficient to provide support to PEM 130. Reinforcement layer 385 can be configured to prevent extrusion or tearing of PEM 130 due to excessive stress caused by the non-uniform flow fields. In certain embodiments, reinforcement layer 385 is formed from a polyester resin.

Figure 12D:
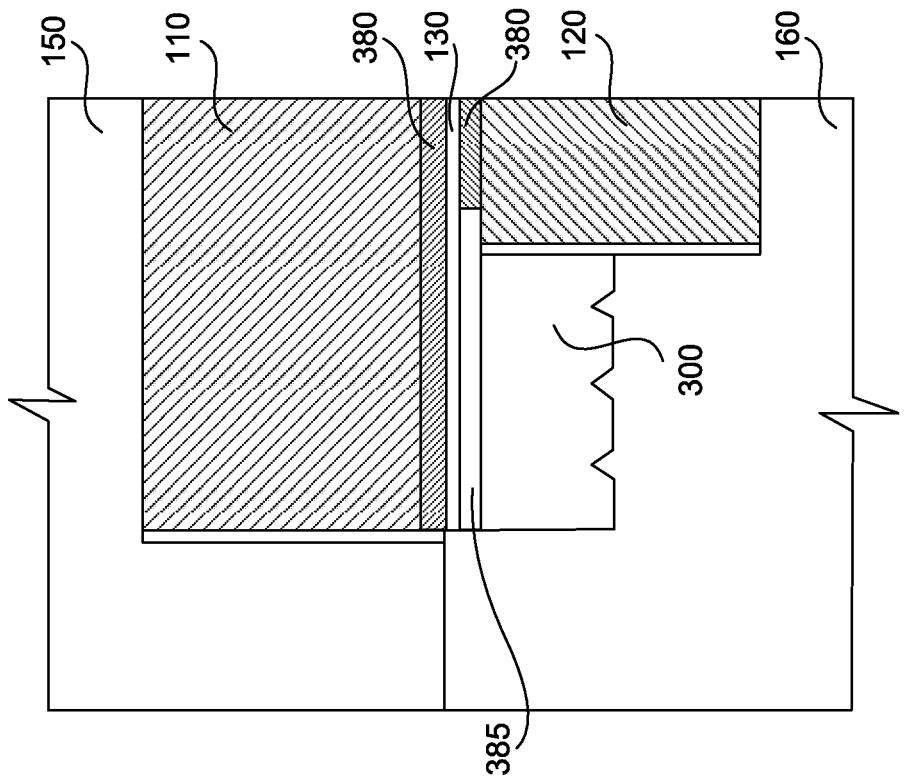
FIG. 12D is a top cross-sectional view of a part of an electrochemical cell, showing a reinforcement layer having a portion extending beyond the length of the gasket, according to another exemplary embodiment.
Figure 12C:
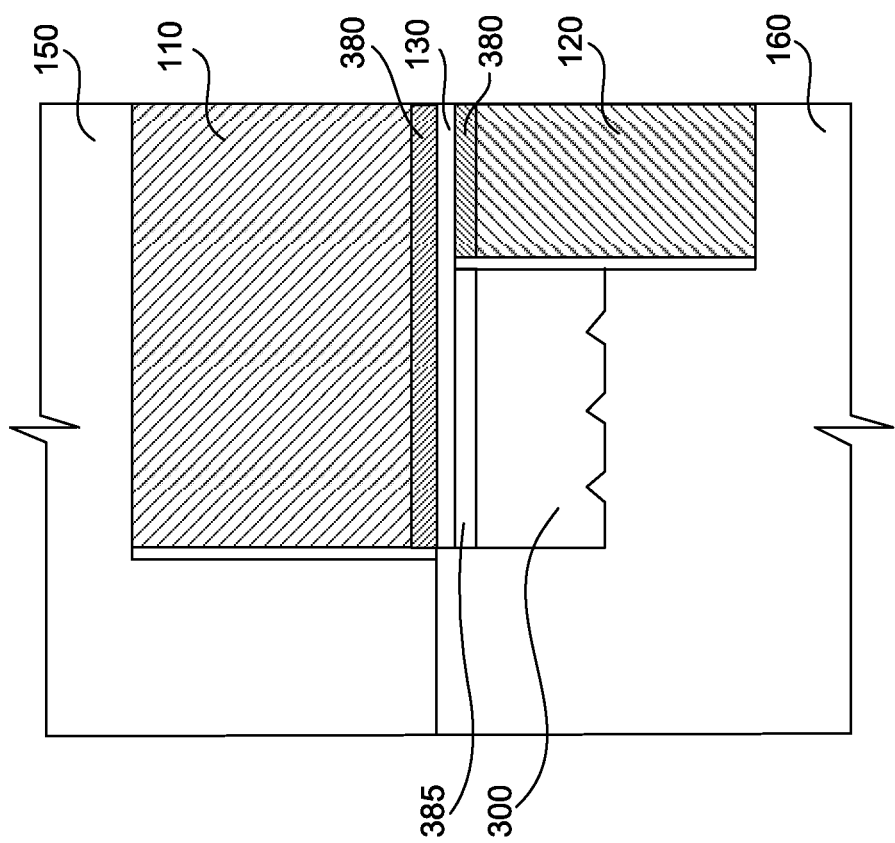
FIG. 12C is a top cross-sectional view of a part of an electrochemical cell, showing a reinforcement layer between the gasket and the PEM, according to an exemplary embodiment.

In the exemplary embodiment shown in FIGS. 12A and 12C, reinforcement layer 385 has a length dimension that is substantially the same as gasket 300. In other exemplary embodiments shown in FIGS. 12B and 12D, reinforcement layer 385 has a length that is greater than a length of gasket 300, e.g., a portion of reinforcement layer 385 extends beyond an edge of gasket 300. In the embodiments shown in FIGS. 12B and 12D, reinforcement layer 385 provides support to PEM 130 in the event PEM 130 bends at the edge of gasket 300.

Figure 13:
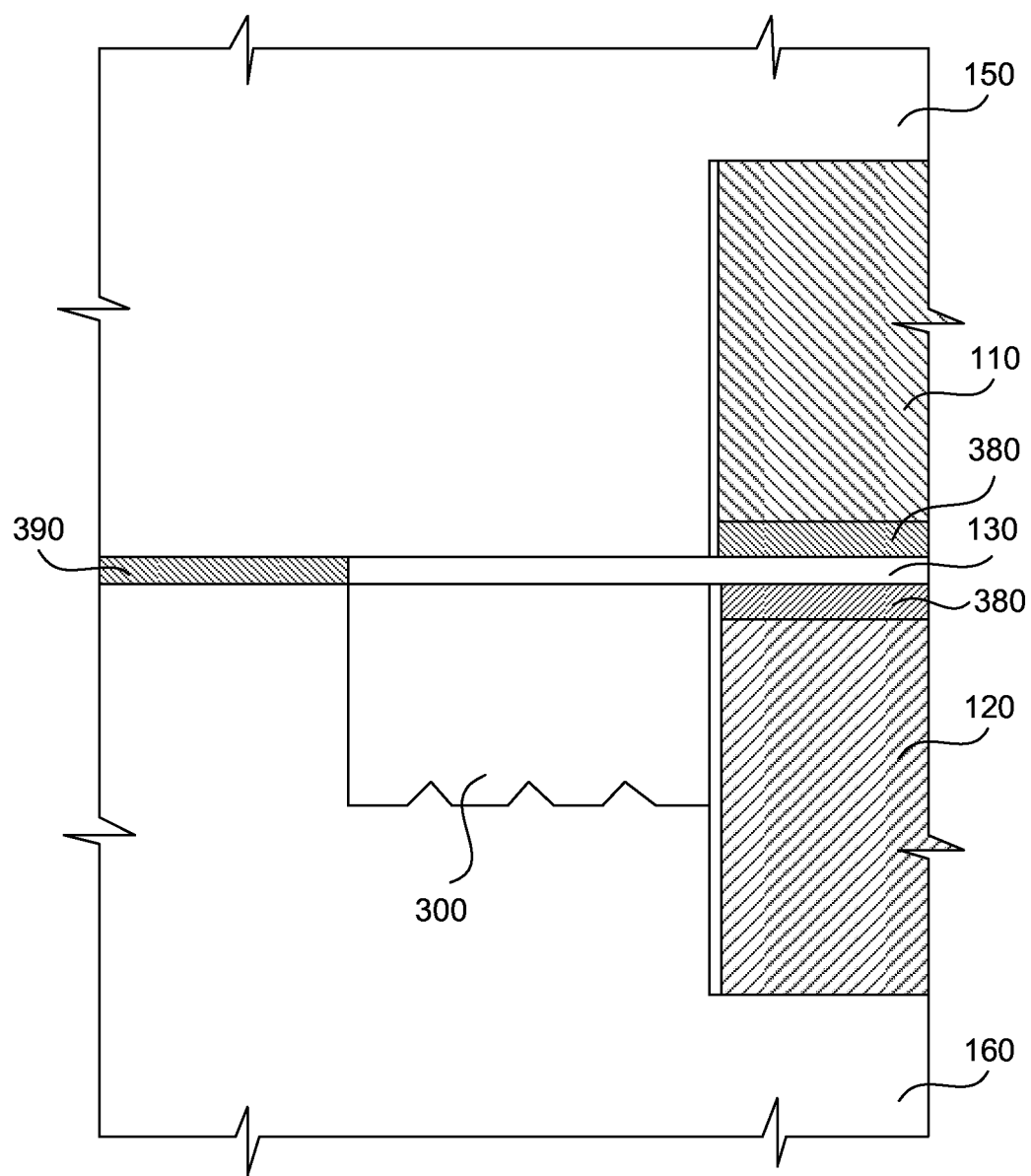
FIG. 13 is a cross-sectional view of a part of an electrochemical cell, showing a shim for use during ex-situ testing of the electrochemical cell, according to an exemplary embodiment.

In various embodiments, the sealing engagement between gasket 300, sealing surface 350, and PEM 130, can be tested ex-situ before assembly of electrochemical cell 100 without loss of integrity of the seal. In particular, a shim 390 can be placed between bipolar plates 150, 160 to prevent full compression of gasket 300 during ex-situ testing. This can ensure that gasket 300 experiences a high stress at sealing surface 350 when fully compressed in the stack. In the exemplary embodiment shown in FIG. 13, shim 390 is shown between bipolar plates 150, 160 to increase the depth of seal 171 and prevent full deformation of the gasket 300 during ex-situ testing.

The seal assembly described above can provide several advantages. While conventional elastomeric seals require less compressive force, the elastomeric seals are susceptible to extrusion and explosive decompression. The disclosed gasket 300, in contrast, can be more resilient. As noted above, the disclosed gasket 300 can be selected to be softer than sealing surface 350 and harder than PEM 130. Accordingly, gasket 300 can be capable of sealing pressures in excess of 15,000 psi. Additionally, gasket 300 can provide a greater dimensional tolerance in the flow field thicknesses and pocket depths than conventional sealing designs. As gasket 300 can deform over a relatively large range of thicknesses, gasket 300 can accommodate variations in pocket depths and flow fields while still maintaining relatively uniform compression pressure.

Figure 14:
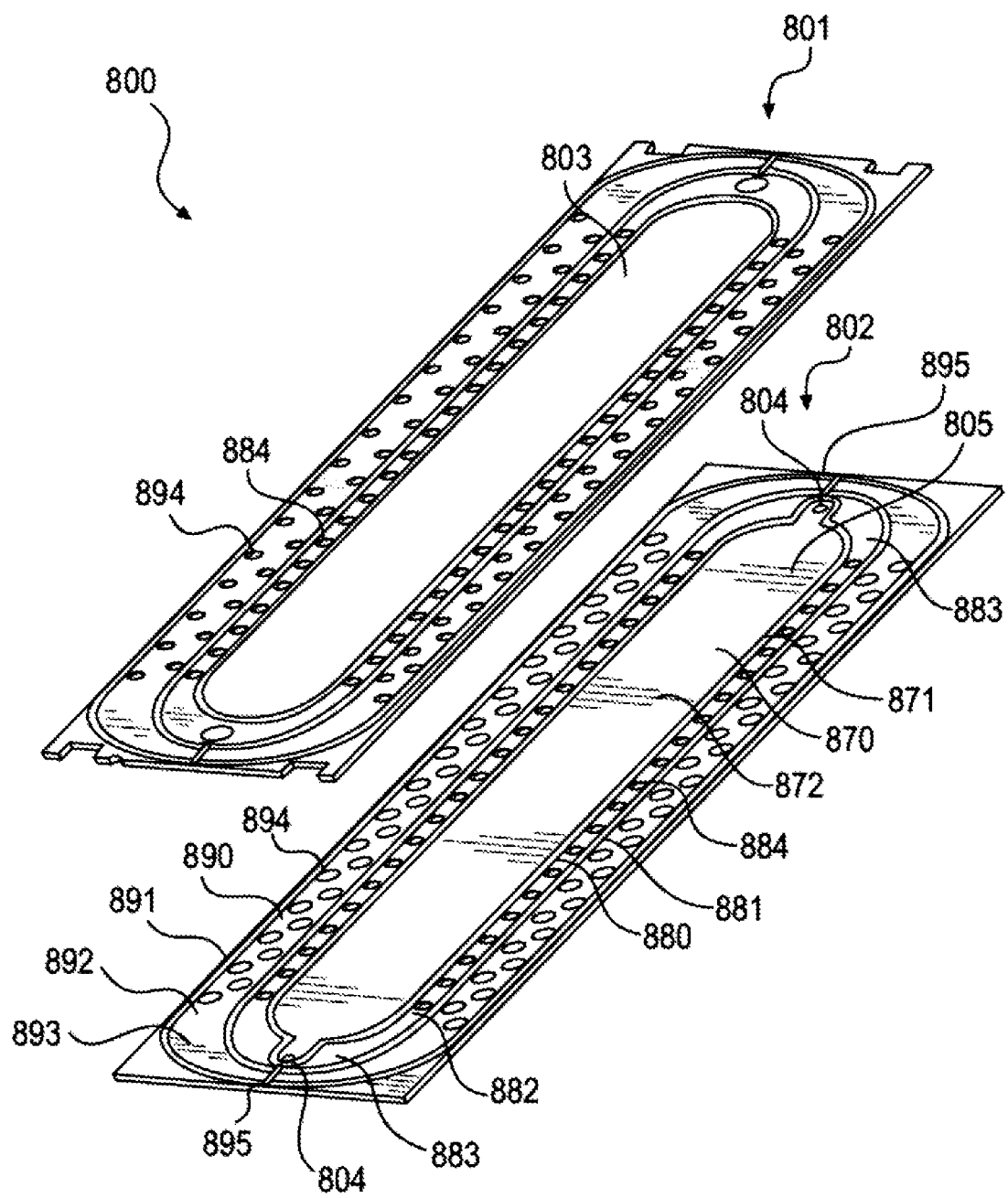
FIG. 14 is an isometric view of a two-piece bipolar plate, according to an exemplary embodiment.

FIG. 14 shows one embodiment of bipolar plates 150 and 160 comprising a two-piece bipolar plate 800 comprising a first component 801 and a second component 802 configured for a cascade seal configuration. First component 801 can form a void 803 in fluid communication with a flow structure 805.

Electrochemical cell 100, as shown in FIG. 1, can further comprise electrically-conductive gas diffusion layers within electrochemical cell 100 on each side of MEA 140. Gas diffusion layers can serve as diffusion media enabling the transport of gases and liquids within the cell, provide electrical conduction between bipolar plates 150 and 160 and PEM 130, aid in the removal of heat and process water from the cell, and in some cases, provide mechanical support to PEM 140. In addition, channels (not shown), known as flow fields, in bipolar plates 150 and 160 can be configured to supply gases to anode 110 and cathode 120 of MEA 140. Reactant gases on each side of PEM 130 can flow through flow fields and diffuse through the porous gas diffusion layers. The flow fields and the gas diffusion layers can be positioned contiguously and coupled by the internal fluid streams. Accordingly, the flow field and the gas diffusion layers can collectively form flow structure 805.

First component 801 and second component 802 can be generally flat and have a generally rectangular profile. In other embodiments, components 801 and 802 can have a profile shaped like a square, a "race-track" (i.e., a substantially rectangular shape with semi-elliptical later sides), circle, oval, elliptical, or other shape. The shape of first component 801 and second component 802 can correspond to the other components of electrochemical cell 100 (e.g., cathode, anode, PEM, flow structure, etc.) or electrochemical cell stack.

First component 801 and second component 802 can each be formed of one or more materials. First component 801 and second component 802 can be formed of the same materials or different materials. Component 801 and 802 can be formed of a metal, such as, stainless steel, titanium, aluminum, nickel, iron, etc., or a metal alloy, such as, nickel chrome alloy, nickel-tin alloy, or a combination thereof.

First component 801 and second component 802 can comprise a clad material, for example, aluminum clad with stainless steel on one or more regions. Cladding can provide the advantages of both metals, for example, in the case of a bipolar plate fabricated from stainless steel-clad aluminum, the stainless steel protects the aluminum core from corrosion during cell operation, while providing the superior material properties of aluminum, such as, high strength-to-weight ratio, high thermal and electrical conductivity, etc. In other embodiments, first component 801 can comprise anodized, sealed, and primed aluminum. Other coatings such as paint or powder coat could be used with component 801.

In some embodiments, first component 801 can be formed of a composite, such as, carbon fiber, graphite, glass-reinforced polymer, thermoplastic composites. In some embodiments, first component 801 can be formed of a metal which is coated to prevent both corrosion and electrical conduction.

According to various embodiments, first component 801 can be generally non-conductive reducing the likelihood of shorting between the electrochemical cells. Second component 802 can be formed of one or more materials that provide electrical conductivity as well as corrosion resistance during cell operation. For example, second component 802 can be configured to be electrically conductive in the region where the active cell components sit (e.g., flow structure, MEA, etc.).

First component 801 and second component 802 can be configured for coplanar coupling. First component 801 and second component 802 can be releasably coupled or fixedly coupled. One or more attachment mechanisms can be used including, for example, bonding material, welding, brazing, soldering, diffusion bonding, ultrasonic welding, laser welding, stamping, riveting, resistance welding, or sintering. In some embodiments, the bonding material may include an adhesive. Suitable adhesives include, for example, glues, epoxies, cyanoacrylates, thermoplastic sheets (including heat bonded thermoplastic sheets) urethanes, anaerobic, UV-cure, and other polymers. In some embodiments, first component 801 and second component 802 can be coupled by a friction fit. For example, one or more seals between the components can produce adequate frictional force between the components when compressed to prevent unintended sliding.

In other embodiments, first component 801 and second component 802 can be releasably coupled using fasteners, for example, screws, bolts, clips, or other similar mechanisms. In other embodiments, compression rods and nuts or other, similar mechanical compression system can pass through bipolar plate 800 or along the outside and be used to compress first component 801 and second component 802 together as electrochemical cell 100 or a plurality of electrochemical cells 100 are compressed in a stack.

Coupled first component 801 and second component 802 can form a plurality of different pressure zones and a plurality of seals can define one or more different pressure zones. FIG. 14 shows the plurality of different seals and pressure zones. As shown in FIG. 14, the plurality of seals can include a first seal 871, a second seal 881, and a third seal 891. First seal 871 can be contained entirely within second seal 881 and second seal 881 can be contained entirely within third seal 891. The shape of first seal 871, second seal 881, and third seal 891 can generally correspond to the shape of bipolar plate 800, as shown in FIG. 14.

In certain embodiments, first seal 871 is formed from protrusions 360 as described above. For example, the protrusions can have a triangular configuration 360*a* (FIG. 9A), a cusp configuration 360*b* (FIG. 9B), a flat blade configuration 360*c* (FIG. 9C), or any other geometry sufficient to form a seal surface. In other embodiments, at least two of first seal 871, second seal 881, and third seal 891 are formed from protrusions 360, and in certain embodiments, all three of first seal 871, second seal 881, and third seal 891 are formed from protrusions 360.

First seal 871 can define a portion of high pressure zone 870 and be configured to contain a first fluid 872 (e.g., hydrogen) within high pressure zone 870. First seal 871 can delimit the outer boundaries of high pressure zone 870 at least between components 801 and 802. High pressure zone 870 can include flow structure 805 extending through void 803 when first component 801 and second component 802 are coupled. First fluid 872 can flow throughout high pressure zone 870 thorough flow structure 805 from cathode 130.

Hydrogen formed at cathode 130 can be collected in high pressure zone 870 and the connection between first component 801 and second component 802 can be sealed by first seal 871. Hydrogen within high pressure zone 870 can be compressed and, as a result, increase in pressure as more and more hydrogen is formed in high pressure zone 870. Hydrogen in high pressure zone 870 can be compressed to a pressure greater than 15,000 psi. Pressure within high pressure zone 870 can apply a separation force on first component 801 and second components 802.

As shown in FIG. 14, first seal 871 can be configured to extend around the exterior of common passages 804. Common passages 804 can be configured to supply or discharge first fluid 872 from high pressure zone 870. Common passages 804 can be in fluid communication with common passages of adjacent electrochemical cells in a multi-cell electrochemical compressor.

Second seal 881 can define the outer circumference of intermediate pressure zone 880. Intermediate pressure zone 880 can comprise an intermediate pressure volume 883 delimited by first seal 871, second seal 881, first component 801 and second component 802. Intermediate pressure zone 880 can be configured to contain a second fluid 882. Intermediate pressure zone 880 can further comprise one or more intermediate pressure ports 884.

Intermediate pressure volume 883 can be configured to collect and direct second fluid 882 to intermediate pressure ports 884. As shown in FIG. 14, intermediate pressure volume 883 can extend around the circumference of high pressure zone 870 separated by first seal 871. The cross-sectional area and volume of intermediate pressure volume 883 can vary based on the geometry of first component 801, second component 802, first seal 871, and second seal 881.

In other embodiments, intermediate pressure volume 883 can be separated into a plurality of intermediate pressure volumes 883, for example, 2, 3, 4 or more intermediate pressure volumes 883. The plurality of intermediate pressure volumes 883 can be separated by a plurality of seals. As shown in FIG. 14, intermediate pressure volume 883 can be separated into two intermediate pressure volumes 883. For example, as shown in FIG. 14, first seal 871 can extend across intermediate pressure volume 883 to second seal 881. The portions of first seal 881 that extend around common passages 804 can connect with second seal 882 separating intermediate pressure volume 883 into two intermediate pressure volumes 883.

As shown in FIG. 14, the one or more intermediate pressure volumes 883 can each be in fluid communication with one or more intermediate pressure ports 884. Intermediate pressure ports 884 can be configured to discharge second fluid 882 contained within intermediate pressure volumes 883. The shape of intermediate pressure ports 884 can vary. For example, intermediate pressure ports 884 can be square, rectangle, triangle, polygon, circle, oval, or other shape. The number of intermediate pressure ports 884 per intermediate pressure volume 883 can vary from 1 to about 25 or more. The cross-sectional area of intermediate pressure ports 884 can vary. For example, the diameter of circular intermediate pressure ports 884 can range from less than about 0.1 inch to about 1 inch or more. As shown in FIG. 14, intermediate pressure ports 884 can be evenly spaced between first seal 871 and second seal 881 and evenly distributed along the length of bipolar plate 800. Alternately, intermediate pressure ports 884 can be non-evenly spaced between first seal 871 and second seal 881 and/or have variable spacing along the length of bipolar plate 800. In other embodiments, intermediate pressure ports 884 can extend the full circumference of intermediate pressure zone 880.

Second fluid 882 discharged via intermediate pressure ports 884 can be resupplied to electrochemical cell 100. For example, second fluid 882 can return to intermediate pressure zone 180. In other embodiments, second fluid 882 discharged via intermediate pressure ports 884 can be collected and recycled. Second fluid 882 in intermediate pressure zone 880 can generally be lower pressure than first fluid 872 in high pressure zone 870.

Third seal 891 can define low pressure zone 890 and be configured to contain a third fluid 892 within low pressure zone 890. Low pressure zone 890 can comprise a low pressure volume 893 delimited by second seal 881, third seal 891, first component 801, and second component 802. Low pressure zone 890 can be configured to contain a third fluid 892. Low pressure zone 890 can further comprise one or more low pressure ports 894.

Low pressure volume 893 can be configured to collect and direct third fluid 892 to low pressure ports 894. As shown in FIG. 14, low pressure volume 893 can extend around the circumference of intermediate pressure zone 880 separated by second seal 881. The cross-sectional area and volume of low pressure volume 893 can vary based on the geometry of first component 801, second component 802, second seal 881, and third seal 891. According to various embodiments, the intermediate pressure volume 883 can be greater than or less than the volume of low pressure volume 893.

As shown in FIG. 14, the one or more low pressure volumes 893 can each be in fluid communication with one or more low pressure ports 894. Low pressure ports 894 can be configured to discharge third fluid 892 contained within low pressure volumes 893. The shape of low pressure ports 894 can vary. For example, low pressure ports 894 can be square, rectangle, triangle, polygon, circle, oval, or other shape. The number of low pressure ports 894 per low pressure volume 893 can vary from 1 to 50 or more. The cross-sectional area of low pressure ports 894 can vary. For example, the diameter of circular low pressure ports 894 can range from less than 0.1 inch to 1 inch or more. As shown in FIG. 14, low pressure ports 894 can be spaced between second seal 881 and third seal 891 and evenly staggered along the length of bipolar plate 800. In other embodiments, low pressure ports 894 can extend the full circumference of low pressure zone 890.

Third fluid 892 discharged via low pressure ports 894 can be resupplied to electrochemical cell 100. For example, third fluid 892 can return to low pressure zone 190. In other embodiments, third fluid 892 discharged via intermediate pressure ports 894 can be collected and recycled. Third fluid 892 in low pressure zone 890 can generally be lower pressure than first fluid 872 in high pressure zone 870 and second fluid 882 in intermediate pressure zone 880.

The cascade seal configuration between first component 801 and second component 802 as described above can be implemented in bipolar plate 150 and 160 of electrochemical cell 100, as described above. In other embodiments, the cascade seal configuration between components 801 and 802 can be implemented in other electrochemical cells in which a cascade seal configuration is not utilized between the two bipolar plates. Therefore, both cascade seal configurations as described above can be independent of one another such that either one can be utilized individually in an electrochemical cell or they can be utilized in conjunction in the same electrochemical cell.

In some embodiments, first component 801 and second component 802 can include interlocking features. The interlocking features may form a mating geometry sufficient to secure first component 801 and second component 802 together. For example, first component 801 may comprise one or more protrusions, and second component 802 may comprise one or more indentations. However, it is further contemplated first component 801 and second component 802 may comprise various attachment mechanisms. Interlocking features may comprise various shapes and sizes. For example, protrusions and indentations may be formed cylindrical, round, elliptical, rectangular, or square in shape. Additionally, protrusions and indentations may include various polygonal shapes.

As shown in FIG. 14, interlocking features may include various connections configured to seal first component 801 and second component 802. For example, interlocking features may include first seal 871, second seal 881, and third seal 891 and the corresponding seal cavity in which they can rest. First component 801 and second component 802 can include a plurality of seal cavities configured to receive at least a portion of first seal 871, second seal 881, and third seal 891. Each seal cavity can comprise an extrusion into first component 801, second component 802 or both components 801 and 802. The extrusion dimensions and geometry can correspond to the dimensions and cross-sectional geometry of first seal 871, second seal 881, and third seal 891.

Other embodiments of the present disclosure will be apparent to those skilled in the art from consideration of the specification and practice of the present disclosure herein. It is intended that the specification and examples be considered as exemplary only, with a true scope and spirit of the present disclosure being indicated by the following claims.

What is claimed is:

1. An electrochemical cell comprising:
a pair of bipolar plates, wherein a sealing surface is formed in only one of the pair of bipolar plates,
a membrane electrode assembly located between the pair of bipolar plates, wherein the membrane electrode assembly comprises an anode compartment, a cathode compartment, and a proton exchange membrane disposed therebetween;
a first seal defining a high pressure zone, wherein the first seal is located between the bipolar plates and configured to contain a first fluid within the high pressure zone; and
a second seal defining an intermediate pressure zone, wherein the second seal is located between the bipolar plates and configured to contain a second fluid within the intermediate pressure zone;
wherein the first seal is formed by a gasket that is configured to plastically deform to create a seal about only one of the cathode compartment or the anode compartment.

2. The electrochemical cell of claim 1, wherein the second seal is formed by a gasket that is configured to plastically deform to create a seal about one of the cathode compartment or the anode compartment.

3. The electrochemical cell of claim 1, wherein the sealing surface includes one or more protrusions.

4. The electrochemical cell of claim 1, wherein the only one of the pair of bipolar plates where the sealing surface is formed has a yield strength greater than a yield strength of the gasket.

5. The electrochemical cell of claim 1, further comprising a third seal defining a low pressure zone, wherein the third seal is located between the bipolar plates and configured to contain a third fluid within the low pressure zone.

6. The electrochemical cell of claim 5, wherein the first seal is contained within the second seal.

7. The electrochemical cell of claim 6, wherein the second seal is contained within the third seal.

8. The electrochemical cell of claim 5, wherein a thickness of the third seal is greater than a thickness of the first and second seals.

9. The electrochemical cell of claim 5, wherein the first second and third seals each have a modulus of elasticity, and the modulus of elasticity of the first seal is different from the modulus of elasticity of the second or third seal.

10. The electrochemical cell of claim 5, wherein at least one of the first, second, or third seals include plastically deformable protrusions.

* * * * *